United States Patent
Temple

(10) Patent No.: US 10,562,240 B2
(45) Date of Patent: Feb. 18, 2020

(54) METHOD OF MAKING A COMPOSITE PRODUCT

(71) Applicant: Printed Structures Limited, Impington (GB)

(72) Inventor: Stephen Temple, Impington (GB)

(73) Assignee: Printed Structures Limited, Impington (GB)

( * ) Notice: Subject to any disclaimer, the term of this patent is extended or adjusted under 35 U.S.C. 154(b) by 109 days.

(21) Appl. No.: 15/553,764

(22) PCT Filed: Feb. 29, 2016

(86) PCT No.: PCT/GB2016/050525
§ 371 (c)(1),
(2) Date: Aug. 25, 2017

(87) PCT Pub. No.: WO2016/135518
PCT Pub. Date: Sep. 1, 2016

(65) Prior Publication Data
US 2018/0043638 A1    Feb. 15, 2018

(30) Foreign Application Priority Data

Feb. 27, 2015 (GB) .................................. 1503420.0

(51) Int. Cl.
*B29C 70/14* (2006.01)
*B29C 70/74* (2006.01)
(Continued)

(52) U.S. Cl.
CPC .......... *B29C 70/14* (2013.01); *B29C 33/3842* (2013.01); *B29C 70/54* (2013.01);
(Continued)

(58) Field of Classification Search
None
See application file for complete search history.

(56) References Cited

U.S. PATENT DOCUMENTS

| | | |
|---|---|---|
| 4,137,354 A | 1/1979 | Mayes, Jr. et al. |
| 5,576,081 A | 11/1996 | Sandt |

(Continued)

FOREIGN PATENT DOCUMENTS

| | | |
|---|---|---|
| CN | 104184222 | 12/2014 |
| DE | 4418809 | 12/1995 |

(Continued)

OTHER PUBLICATIONS

Machine translation of DE 4418809A1 (translated Apr. 15, 2019) (Year: 1995).*

(Continued)

*Primary Examiner* — Edmund H Lee
(74) *Attorney, Agent, or Firm* — Buchanan Van Tuinen LLC

(57) ABSTRACT

A fibre reinforced composite product can be made by first forming a scaffold structure (400) with a set of tubes (408) running within the product interior, using a digital printing process. Using a carrier fluid, the tube lumens are invested with fibres and then matrix material. The carrier fluid may enter through the end of a tube connecting with an input manifold (920) and exit the tube radially via a capillary (904, 908) which runs alongside the tube.

16 Claims, 16 Drawing Sheets

(51) Int. Cl.
*B33Y 80/00* (2015.01)
*B29C 33/38* (2006.01)
*B29C 70/54* (2006.01)
*B29C 39/10* (2006.01)
*B29C 64/00* (2017.01)

(52) U.S. Cl.
CPC ............ *B29C 70/745* (2013.01); *B33Y 80/00* (2014.12); *B29C 39/10* (2013.01); *B29C 64/00* (2017.08)

(56) References Cited

U.S. PATENT DOCUMENTS

2003/0186042 A1* 10/2003 Dunlap .................. B29C 39/24
428/304.4
2014/0349043 A1 11/2014 Greer

FOREIGN PATENT DOCUMENTS

| | | |
|---|---|---|
| DE | 102013225907 | 6/2015 |
| JP | 10-193937 | 7/1998 |
| WO | 0114129 | 3/2001 |
| WO | WO0114128 | 3/2001 |
| WO | 2011054975 | 12/2011 |
| WO | 2016135518 | 9/2016 |

OTHER PUBLICATIONS

International Searching Authority, "International Search Report," for international application No. PCT/GB2016/050525, dated Jul. 21, 2016, pp. 1-20.

Chinese National Intellectual Property Administration. "Office Action" for Chinese application No. 201680012427.0, dated Apr. 11, 2019, pp. 1-5.

* cited by examiner

METHOD OF MAKING A COMPOSITE PRODUCT

TECHNICAL FIELD OF THE INVENTION

The present invention relates to composite products such as a Fibre Reinforced Composite (FRC) product, methods of manufacturing and structures useful in manufacture.

BACKGROUND TO THE INVENTION

Broad Definition of FRC

Typically, the fibre reinforcement in an FRC consists of materials having a very high strength-to-weight ratio such as carbon, glass and certain polymeric materials such as polyaramid (Kevlar) or polyethylene (Dyneema) or organic materials such as Bamboo. These are produced as "tows" of long fibres or as short staples either in the form of spun yarns or randomly arranged, but in all cases are bound together by a matrix material made of polymers either in the form of thermosetting adhesives such as epoxy or polyester resins or as thermoplastic materials such as polyether ether ketone (PEEK) or Nylon and the like. The fibres generally carry the principal stresses to which the final material is to be subjected, and the matrix material carries the shear stresses which arise because of stress gradients within the structure. In some cases, the matrix may be a relatively strong material such as a ceramic, and the fibres are used in relatively small quantities to impede crack propagation in the final material, but more normally, the fibres constitute a large proportion of the final structure and the matrix simply acts to bind the fibres together.

Issues with FRC Products

FRC structures can be manufactured in various ways. The process used may depend on a number of factors including the volume, the quality of product required and the complexity of the final shape. To optimise strength/weight performance, the reinforcing fibres should be precisely positioned in accordance with the anticipated stress. For products which are not simple beams or plates and for high performance products, this often requires complex and expensive arrangements which may still not always achieve maximum performance. Practically, most economically viable manufacturing processes impose significant limitations on the reinforcing fibre arrangements. For example, in many processes, fibres are formed in layers in the final structure. Such layered or laminated structures are prone to delamination, wherein the laminates separate at the interface between two layers as a result of shear stresses.

A further issue with existing manufacturing techniques is that the process itself imposes stresses on the fibres and causes damage to them, resulting in significant loss of strength.

A further issue is that restrictions imposed by the assembly processes result in low fibre fill ratios. Since the fibre and matrix materials have comparable density, any excess volume occupied by the matrix material contributes to the weight but little to the strength.

A further issue is that the manufacturing processes usually require uniform distributions of fibre (for example, weaving produces homologous layers of material), but the stresses are unlikely to be so distributed. Consequently, the weights of tows and mats have to be designed to carry the maximum stresses arising, and this means that there will be excess material at all locations other than those subjected to the maximum stress.

One known method of manufacturing a composite material is by 3D weaving, whereby the threads are woven to form principle axes and planes of reinforcement and the resulting voids are later filled with—for example—foam. The resulting composite structure can have good all-round properties; in particular, the structural cell consisting of fibres laid in the principle directions for carrying direct stresses and fibres at ±45° for carrying shear stresses is versatile and allows the building of highly effective structural components. However, 3D weaving processes, while economically viable for higher performance applications, still impose restrictions on fibre alignment arising from the topology of the weaving machine and process. A further major limitation with the weaving process is the inability to vary the thickness of fibre along the fibre direction. Thus, 3D weaving of composite products is mostly used for essentially linear structures of constant cross section and carrying simple bending stresses.

An alternative process, braiding, inter-plaits three orthogonal sets of yarn (a length of interlocked fibres). Braiding forms intermediary structures, or tubes, used to produce the finished structure, the tubes being formed with both torsional and bending stiffness along their lengths, but again without the option to vary the size of the tube.

The as woven fibre structures tend to lack rigidity in themselves (until the matrix material has been injected and/or cured) and usually do not adequately define the overall shape of the product. So, additional material or components and complicated handling procedures are frequently required to define the overall shape.

Examples of Complex Products

In order to perform their function, some structures must carry stresses in two directions and torsion along their lengths, as well as having very particular shape requirements. For example, turbine blades require that the net shape of the aerofoil section varies and twists along the lengths of the blades. The principal stresses arise from bending both along the span and along the chord, together with torsion along the span due to the varying air pressure distribution as the sections change. Most of the stresses are carried in the skin, with the internal space largely void, but the structure needs to be stabilised with occasional webs connecting the skins both in the chord section (ribs) and along the span, and these webs need to be able to resist the buckling and shear stresses which arise between the outer skins. Thus, the overall requirement for arranging the fibres in an FRC turbine blade require them to be laid in at least two directions within the (curved) shape of the skins and at least two more directions forming intersecting webs internally. All of the sections and stresses vary along the length, calling for variable amounts of fibre throughout the structure.

Another example of high performance products is aircraft seating. Seats for aircrafts must satisfy particular standards, particularly in terms of impact resistance. For example, a dynamic crash resistance test subjects the seats to forces of up to 16 g. In order to meet these requirements, aircraft seats are typically produced using a large number of parts, including more recent use of composite materials to reduce the weight. Manufacturers have also tried to reduce the number of parts required; the more parts used, the more complex and costly the logistics and process of manufacturing such seats. Furthermore, the fastenings for these parts are often metal to be able to satisfy the safety requirements, increasing the weight of the seats. Moreover, attachment points such as these introduce stress concentrations and changes in stress direction that are difficult to transfer efficiently into the main load bearing members. Producing one piece aircraft seats using rotational moulding has been proposed, but the heating and cooling processes can be costly and there are limitations on the materials that can be used and precision with which shapes can be formed. It is also beneficial to reduce the volume of aircraft seats to be able to fit more seats onto an aircraft and/or increase the space allotted to each individual.

These are just two examples of a wide variety of applications that would benefit from the ability to produce high performance composite products in an efficient manner, with no or few design constraints imposed on the final product by the production process and with minimum stress applied to the fibres during the processing.

There is thus seen to be a need for new synthetic composite products and methods of manufacture that remove some of the constraints of existing techniques; permit the economic production of complex or high performance products; and/or enable the use in composite products of materials or combinations of materials not previously thought suitable.

SUMMARY OF THE INVENTION

Purposes

One purpose of the present invention is to provide a form of composite structure that overcomes or ameliorates some or all of the above limitations. In particular, it would be desirable to have a method which allows the placement of fibres in arbitrary directions and quantities throughout the finished structure and which allows the formation of finished shape composite products in which the fibre reinforcements are arranged to be suitable for sustaining the loads imposed upon the finished product.

A second purpose of the invention is to provide methods of designing and making FRC which maximises the proportion of fibre within the final structure whilst minimising the amount of matrix material binding the fibres.

Aspects

Various aspects of the present invention provide a manufacturing process with which these objectives may be achieved by first creating a scaffold/guide structure that defines tube lumens in various sizes and orientations distributed within the finished shape. Methods are provided by which the tube lumens may be filled with fibre whilst exerting a minimum of handling stresses upon the fibres.

Certain methods are also provided for filling non-stress-bearing spaces within the structure with space filling lightweight elements such as arrays of struts or foams.

According to one aspect of the present invention, there is provided a method of making a composite product having an external surface defining a product interior, the method comprising the steps of forming a scaffold structure comprising a set of tubes defining respective tube lumens running within the product interior; investing the tube lumens with fibres and optional matrix material, wherein the step of investing the tube lumens with fibres comprises flowing a carrier fluid through and out of the tube lumens, the carrier fluid carrying said fibres; and hardening any matrix material.

Carrier fluid carrying fibres may enters the tube lumen axially at an end that extends to the external surface of the product. Carrier fluid may leave the tube lumen radially. Matrix material may be introduced in fluid form into each tube lumen, after investing of the tube lumen with fibres and enter the tube lumen radially.

One or more radial ports may be provided in a tube at least one radial port of one tube in the set of tubes may be interconnected with at least one radial port of another tube in the set of tubes. Some of the tubes may have porous walls enabling the passage of carrier fluid or matrix material but substantially preventing the passage of fibres. Removal of carrier or other fluid from a tube lumen may be promoted by the application of a vacuum.

The scaffold structure may comprise at least one connection exterior to the product and communicating with at least some of the tube lumens, which connection is removed after the tube lumens have been invested with fibres and optional matrix material via the connection.

The connection may comprise at least one fluid inlet manifold communicating with first ends of a set of tubes and at least one fluid outlet manifold. The scaffold structure may comprise a a secondary fluid network serving to fluidly interconnect the respective tube lumens of a particular set, said network communicating with the fluid outlet manifold and/or a second fluid inlet manifold.

The scaffold structure may further comprise a respective capillary running essentially parallel to each tube lumen, carrier fluid flowing radially out of the tube lumen and into the associated capillary. Each capillary may be of smaller cross section than the associated tube. Carrier fluid may flow radially out of the the tube lumen and into the associated capillary via holes in or porosity of a shared wall.

Voids defined within the product between tubes may communicate with a fluid outlet manifold. The scaffold structure may include compression resistant struts in voids defined within the product between tubes, the struts serving to interconnect tubes. A foam may be formed in a void or voids between the set of tubes to support the tubes.

After formation of a set of tubes with tube walls formed of tube material and before investing the tube lumens with fibres, a tube wall thickness may be reduced or a tube wall removed by removal of tube material, suitably by etching. The tubes may be divided into sets and differential etching of tube material effected between respective sets.

The scaffold structure may be formed in a digital printing process.

According to another aspect of the present invention, there is provided a synthetic composite product having an external surface, the product comprising: a plurality of elongate tube lumens each with a tube length direction, the length L of each tube lumen being at least 100 times greater than a dimension r of the tube lumen orthogonal to the tube length direction, the tube lumen opening to the external surface of the product at one end of the tube, at least; reinforcing fibres within the lumen of each tube, substantially aligned with the tube length direction, each fibre being of a length substantially less than that of the reinforcing tube and the fibres within each tube forming no wound fibre structure extending the length of the tube and having itself material tensile strength; and a tube matrix material within the lumen of each tube, the tube matrix material having a liquid precursor phase with a precursor viscosity $\eta$; the reinforcing fibres being embedded at a fibre density in the tube matrix material and being formed of a material different from the tube matrix material, where a defined fluid comprising the tube matrix material in the liquid precursor phase carrying said reinforcing fibres at said fibre density has a fibre loaded precursor viscosity $\eta'$ which is at least 100 times greater than $\eta$. The volume fraction fibre loading in at least some of the lumens may be greater than 20%; 30%; 40% or 50%. The mean fibre length in each lumen may be greater than 2 mm; 3 mm; 4 mm; 5 mm; or 6 mm.

Elongate tubes may be formed of a tube material, each tube defining a respective one of said tube lumens. A body filler may be disposed between at least some of tubes and resisting in compression any material deformation between those tubes. The body filler may have a lower density than that of the tube matrix material and preferably takes the form of a foam or a network of compression resistant struts.

The external surface of the product may be curved in a region of the product and at least some tube lumens may run conformally with the curvature in the region. In some cases, the product has branches and the tube lumens divide from each other at the branches so as to transmit stresses continuously from one branch to another. The product may have an internal stress distribution and wherein the tube lumens are aligned with the stress distribution.

The fibres may be inorganic, short staple and the tube matrix material strong in compression. The fibres may be formed of a high melting point material such as glass or carbon and the tube matrix material is a ceramic. The fibres may be formed of an organic material such as wood and the matrix material is an organically compatible material such as lignin.

According to another aspect of the present invention, there is provided a scaffold structure for use in making a composite product having an external surface defining a product interior, the scaffold structure comprising a set of tubes defining respective tube lumens running within the product interior for investing with fibres and optional matrix material, in which at least the tubes are formed in a digital printing process.

One or more radial ports may be provided in a tube and at least one radial port of one tube in the set of tubes may be interconnected with at least one radial port of another tube in the set of tubes. Some of the tubes may have porous walls.

The scaffold structure may comprises a plurality of sets of tubes defining respective tube lumens running within the product interior and a secondary fluid network serving to fluidly interconnect the respective tubes of a particular set, said secondary fluid network being constructed in said digital printing process. The scaffold structure may comprise at least one connection exterior to the product and communicating with at least some of the tube lumens, this connection may comprise at least one fluid inlet manifold communicating with first ends of a set of tubes and at least one fluid outlet manifold.

Voids defined between tubes communicate with at least one connection exterior to the product. The scaffold structure may include compression resistant struts serving to interconnect tubes or a foam in a void or voids between the set of tubes to support the tubes.

The digital printing process may comprise cyclically laying down a powder and printing into it a binder.

Some of the tubes may have a respective capillary extending along a substantial proportion of the length of the tube, permitting fluid flow radially between the tube and the capillary.

The tubes may be divided into sets to enable differential etching of tube material between respective sets.

According to yet another aspect of the present invention, there is provided a scaffold structure for use in making a composite product having an external surface defining a product interior, the scaffold structure comprising a set of tubes defining respective tube lumens running within the product interior for investing with fibres and optional matrix material and at least one manifold outside the product interior having a common manifold port interconnecting with at least 1000 tube lumens for delivery to the tubes of fibre or matrix material.

Radial ports may be provided in a tube, suitably with at least one radial port of one tube in the set of tubes is interconnected with at least one radial port of another tube in the set of tubes. Some of the tubes may have porous walls. The scaffold structure may comprise a plurality of sets of tubes defining respective tube lumens running within the product interior and secondary fluid network serving to fluidly interconnect the respective tubes of a particular set and connected with said manifold. The manifold may comprise at least one fluid inlet manifold communicating with first ends of a set of tubes and at least one fluid outlet manifold communicating with second ends of said set of tubes. The manifold may comprise at least one fluid inlet manifold communicating with first ends of a set of tubes and at least one fluid outlet manifold configure to receive fluid exiting the tube lumens radially.

The tubes may be formed in a digital printing process.

At least some of the tubes may have a respective capillary extending along a substantial proportion of the length of the tube, permitting fluid flow radially of the tube into the capillary. The manifold may comprise at least one fluid inlet manifold communicating with first ends of a set of tubes and at least one fluid outlet manifold communicating with said capillaries.

According to a still further aspect of the present invention, there is provided a composite product having an external surface defining a product interior, the method comprising the steps of: forming a scaffold structure comprising at least one set of at least 1000 tubes defining respective tube lumens running within the product interior; andinvesting the tube lumens of the set in parallel with fibres.

According to yet a further aspect of the present invention, there is provided a synthetic composite product having an external surface, the product comprising: a plurality of elongate tubes each with a tube length direction and comprising a tubular wall formed of a tube wall material and defining a tube lumen; reinforcing fibres within the lumen of each tube, substantially aligned with the tube length direction, each fibre being of a length substantially less than that of the tube and the fibres within each tube forming no wound fibre structure extending the length of the tube and having itself material tensile strength; and a tube matrix material within the lumen of each tube, the reinforcing fibres being embedded in the tube matrix material and being formed of a material different from the tube matrix material; wherein the plurality of elongate tubes provide: at least one first local region in the product where a first set of locally parallel tubes is interleaved with a second set of locally parallel tubes generally orthogonal to the first set of tubes; and/or at least one second local region in the product where a first set of tubes run in or tangential to a first plane and a second set of tubes run at around 45° or ±45° to said first set of tubes in a or tangential to second plane which second plane is orthogonal to said first plane and which second plane is parallel to one of said first tubes.

The product may comprise a body filler disposed between at least some of tubes and resisting in compression any material deformation between those tubes. That body filler may have a lower density than that of the tube matrix material and preferably takes the form of a foam or a network of compression resistant struts.

Suitably, there is in said second local region a third set of tube lumens which run at around 45° or ±45° to said first set of tubes and parallel or tangential to said first plane. There may also be in said second local region a fourth set of tube lumens which run parallel or tangential to a third plane orthogonal to said first plane and said second plane.

DETAILED DESCRIPTION OF EMBODIMENTS OF THE INVENTION

Embodiments of the present invention will now be described, by way of example only, with reference to the accompanying drawings, in which:

FIG. 4b is an end view of the scaffold structure shown in FIG. 4a;

STRUCTURAL DESIGN PROCESS

The design and subsequent production of a fibre reinforced product can be approached by first analysing the function to be performed; choosing a layout with a suitable arrangement of fibre reinforcement; anticipating the stresses to be encountered in use within the chosen fibre layout; and—within the required exterior form of the product—defining in detail those paths that reinforcing fibres should ideally follow to achieve optimum strength for minimum weight.

Choices can then be made of the appropriate materials and form of the fibres, such as: polymeric/ceramic/metallic/hybrid; natural/synthetic; short/long, monofilament/twisted/braided and so on. Complementary choices can then be made of those materials which will form the remainder of the product.

Complex structures may not be subject to homologous stresses. Therefore, in order to create the most efficient of products, an existing or virtual object of the type to be created may be analysed for the stresses thereon. Any method of stress-strain analysis may be used in order to evaluate the maximum and/or typical forces expected to be exerted on each point of the structure. Such methods may include computational simulation, analytic mathematical modelling or classical mathematical techniques, through experimental testing techniques or a combination of methods thereof. The possible deformation of the object that may be caused by those stresses may thus be determined. In this way, stress-strain analysis may be used as a tool to ensure that the resulting products may be as efficient as possible, being able to withstand the necessary loads using the minimum amount of material, whilst also possibly satisfying other optimality criterion. The methods of the invention allow the choice of placement of load carrying fibre such that substantially all of the material then contained therein may serve some structural functionality for the resulting product, in particular the fibres may follow stress lines within the object and/or provide structural integrity to the parts liable to deformation and/or otherwise.

An example of a very efficient structural element is an I-beam in which the flanges carry direct stresses and the web carries shear stresses. Fibres best address these stresses by being placed longitudinally along the flanges and at ±45° in the web.

Figure 1:
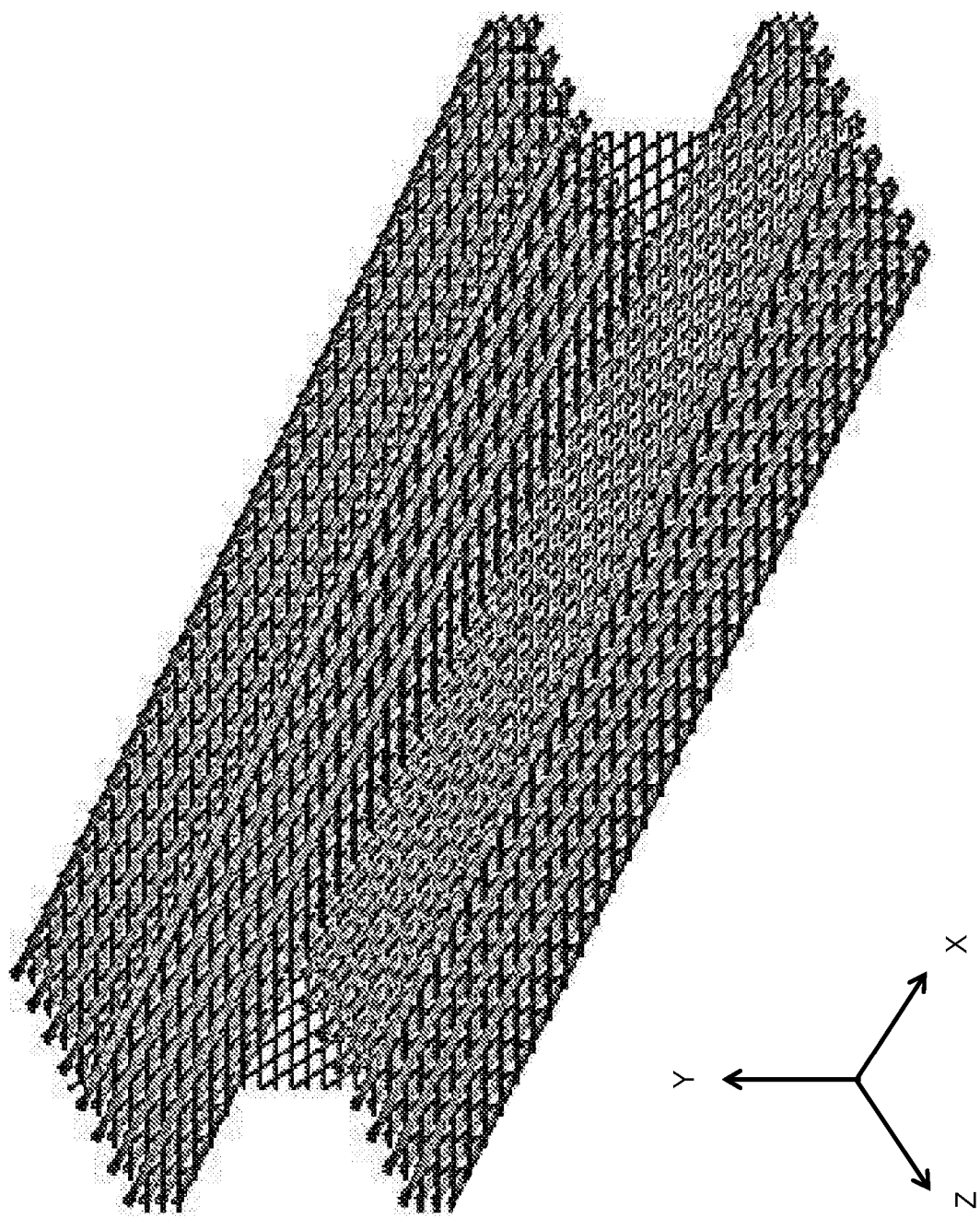
FIG. 1 is a perspective view of a flange/web component which can be produced by 3D weaving showing the orientation of fibre reinforcement.

A simple structure formed using flange/web components can be made by conventional weaving techniques. The principles of flange/web can also be employed usefully in more complex structures, but with increasing difficulty in the manufacturing process. Referring to FIG. 1, there is shown a flange/web component with 3D fibre reinforcement. The flanges are dominated by uni-directional fibres laid in the X direction. The web consists of ±45° fibres laid in the X-Y plane. More, probably lighter, ±45° fibres also tie together the X fibres in the flanges, zig-zagging through the thickness of the flange. Fibres in the Z direction (not shown) hold the X-Y plane layers together to give sufficient handling strength to allow for later placement into a mould and injection of resin and also to prevent low level shear stresses from delaminating these layers.

Figure 2:
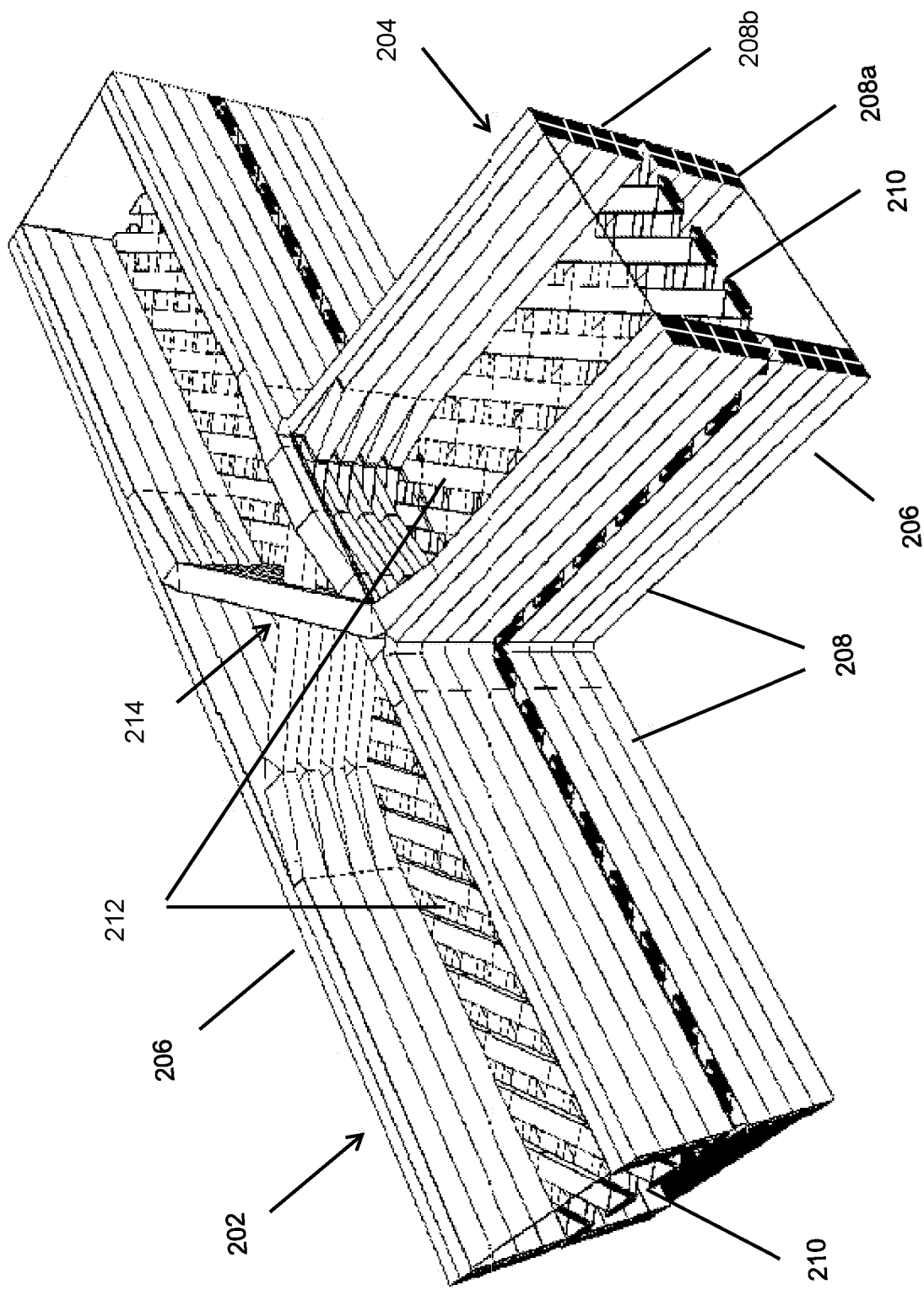
FIG. 2 is a perspective view of a Tee-junction using the flange/web structure.

FIG. 2 shows a more complex form of an I-beam structure. There are generally shown two I-beams 202, 204 interconnected at right angles. Each I-beam has flanges 206 defined by longitudinal fibres 208, with those longitudinal fibres being arranged in an inner layer 208a and an outer layer 208b. The web 210 of each beam is formed from sets of fibres 212 running at ±45°.

It will also be seen that at least one local region in the product has a first set of locally parallel tubes which are interleaved with a second set of locally parallel tubes generally orthogonal to the first set of tubes.

What is depicted is a T-junction between beams with a junction strength that approaches that of the beams. It will be understood that a symmetric arrangement would produce a Y-junction and that the angles at which the beams meet can be varied.

At the joint, bending arising from loads applied to any combination of the 3 legs results in stresses "flowing" across the joint along different paths. Ideally, the fibres forming the flanges should interlace approximately as shown at 214 in order to transmit these stresses from one leg to another. The web should be formed from a continuous set of ±45° tows of fibres conforming to the shape of the Tee. Such an arrangement of fibres could not be produced on a loom and would require very complex laying up procedures if attempted by hand. It should also be noted that the sections of the I-beams are likely to carry varying stresses along their lengths, and this would be most efficiently accommodated by varying either or both of the section shapes and the amount of fibre along the length of each leg.

Figure 3:
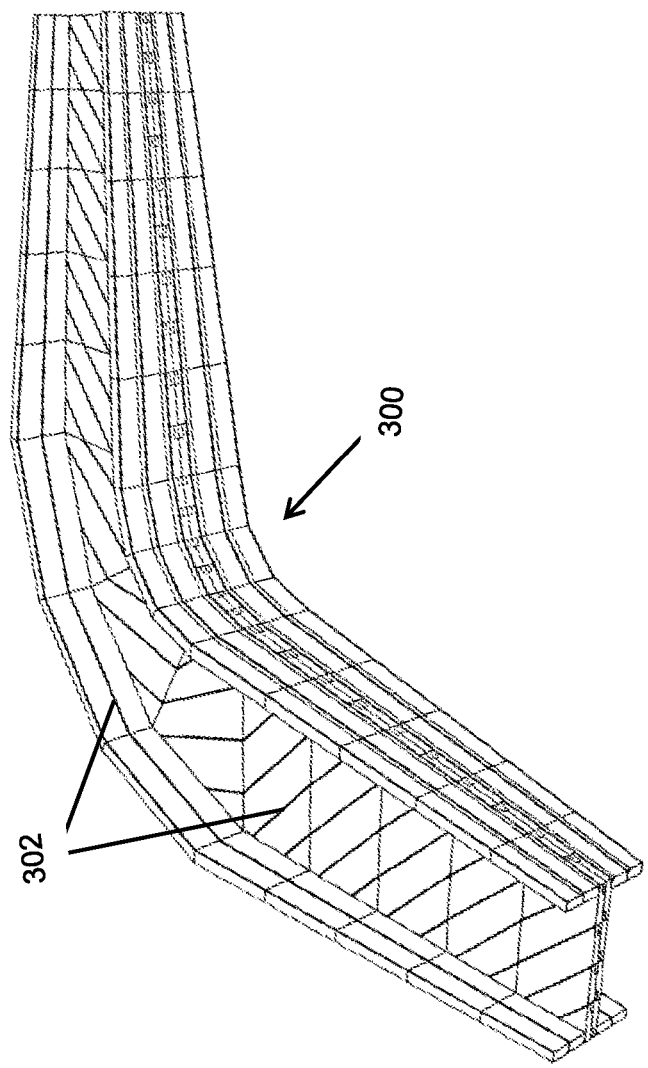
FIG. 3 is a perspective view of a curved and tapered I-beam indicating the alignment of the fibres.

FIG. 3 shows a curved and tapered I-beam 300, with the lines 302 on its surface indicating the directions in which the fibres should lie to provide a complex but structurally efficient shape. Such a component could form part of the overall shape appropriate to making the aircraft seat cited above. Both the Tee shape and the curved I-beam would be extremely difficult to manufacture by conventional methods, but lie within the compass of the current invention the aim of which is to enable the production of finished FRC products of arbitrary shape containing arrangements of fibre reinforcement well suited to the expected loads to which the product will be subjected.

Of course, the Flange/Web combination is not the only way in which FRC can be used to meet structural performance criteria, and the current invention is not limited to such structures.

Scaffold Structure

The manufacturing method of one example of the invention will now be described in its most basic form. The process consists of 3 steps 1. Production of a scaffold/guide system consisting of tubes that define the fibre paths and the external shape of the final product
2. Filling of the tubes with fibre and matrix material
3. Finishing of the external shape.

The scaffold structure will typically be complex, usually with 1000 or more tubes. These will usually have a length in excess of 100 times the radius or radial dimension of the tube.

EXAMPLE PROCESS 1

Figure 4A:
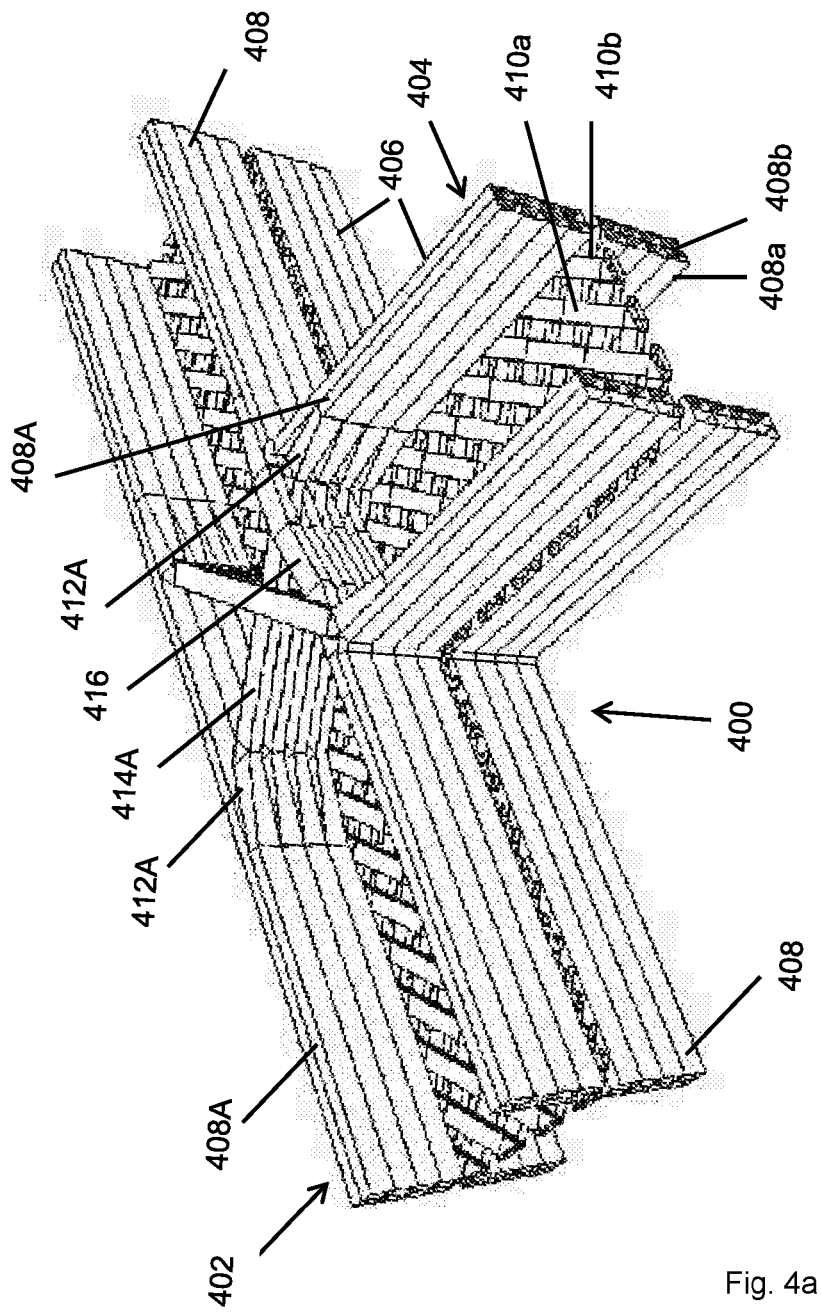
FIG. 4a is a perspective view of a scaffold structure for use in the manufacture of a joint as shown in of FIG. 2, showing the scaffold/guide tubes for the manufacturing process.
Figure 4B:
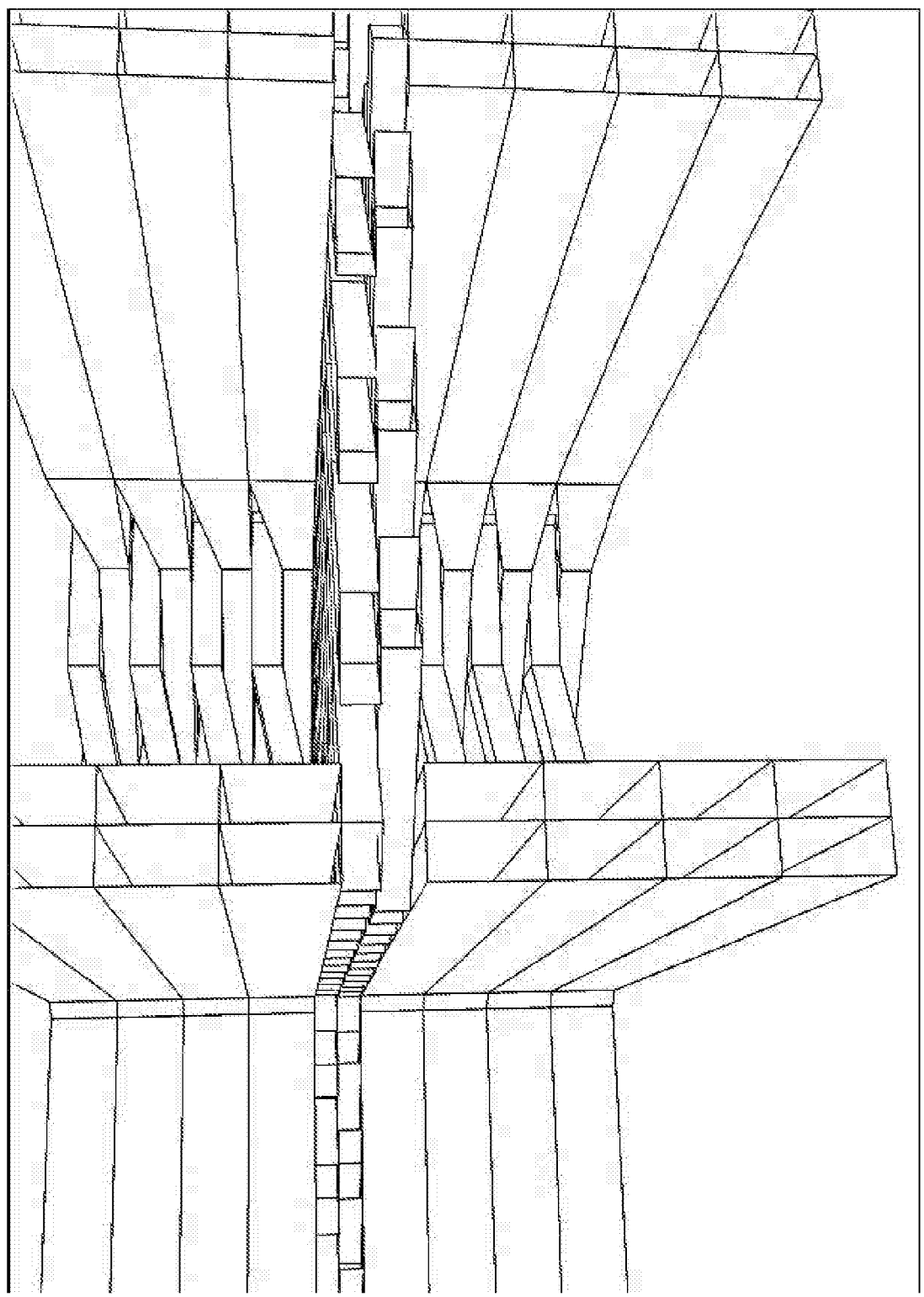

A first step in production of an FRC according to the invention is to derive a scaffold structure comprising a set of tubes and defining the overall shape of the product. The tubes follow the fibre paths identified in the design process above. The tubes, or some or parts of them, will remain within the finished product and the material from which the tubes are formed will be chosen with this in mind. The tubes may form regular arrays or may follow complex paths, having straight and curved portions as appropriate. Those paths may interweave with the paths of other tubes. FIG. 4 shows an enlarged form of such a scaffold structure suitable for the manufacture of the Tee-joint of FIG. 2

It will be seen that the paths of the tubes of the scaffold structure 400 define the eventual layout of fibres in a right angle joint between two I-beams 402 & 404. Each I-beam has flanges 406 defined by longitudinal tubes 408, with those longitudinal tubes being arranged in an inner layer 408a and an outer layer 408b. The web of each beam is formed from sets of tubes 410a and 410b running at ±45°.

The inner layer of flange tubes also serves to define the paths of interlaced fibres which will—in the finished product—transmit stresses from one I-beam to the other. Specifically, a tube in the inner layer 408a of beam 402 (for example tube 408A) has a tapering region 412A which interconnects with a diagonal region 414A, interconnecting in turn with a tapering region 412A of a tube 50A in the inner flange layer of beam 50. It will be seen that diagonal regions 414A have a height dimension (as seen in the figure) which is approximately half the corresponding dimension of the tubes 408a in the flanges. This enables the diagonal regions extending in opposite senses to be interleaved. The tapering regions 412A provide for smooth transition from the aspect ratio of the flange tube to the aspect ratio of the diagonal region, with the cross sectional area of the tube lumen remaining essentially constant. Transverse regions 416 extend in similar fashion between tapering regions to provide continuity in those tubes in the flange of beam 402 which abuts beam 404. Again, these transverse regions 416 are interleaved in the height direction with both sets of diagonal regions.

A particularly effective technique for manufacturing the scaffold structure will be 3D printing, in one of its many variants. 3D printing allows the production of shapes that are too complex to produce by conventional methods—in particular where elements of the structure interweave with each other in more than two directions. It is therefore ideally suited to producing tubes that follow the pathways defined by 3 dimensional stress patterns.

Figure 5:
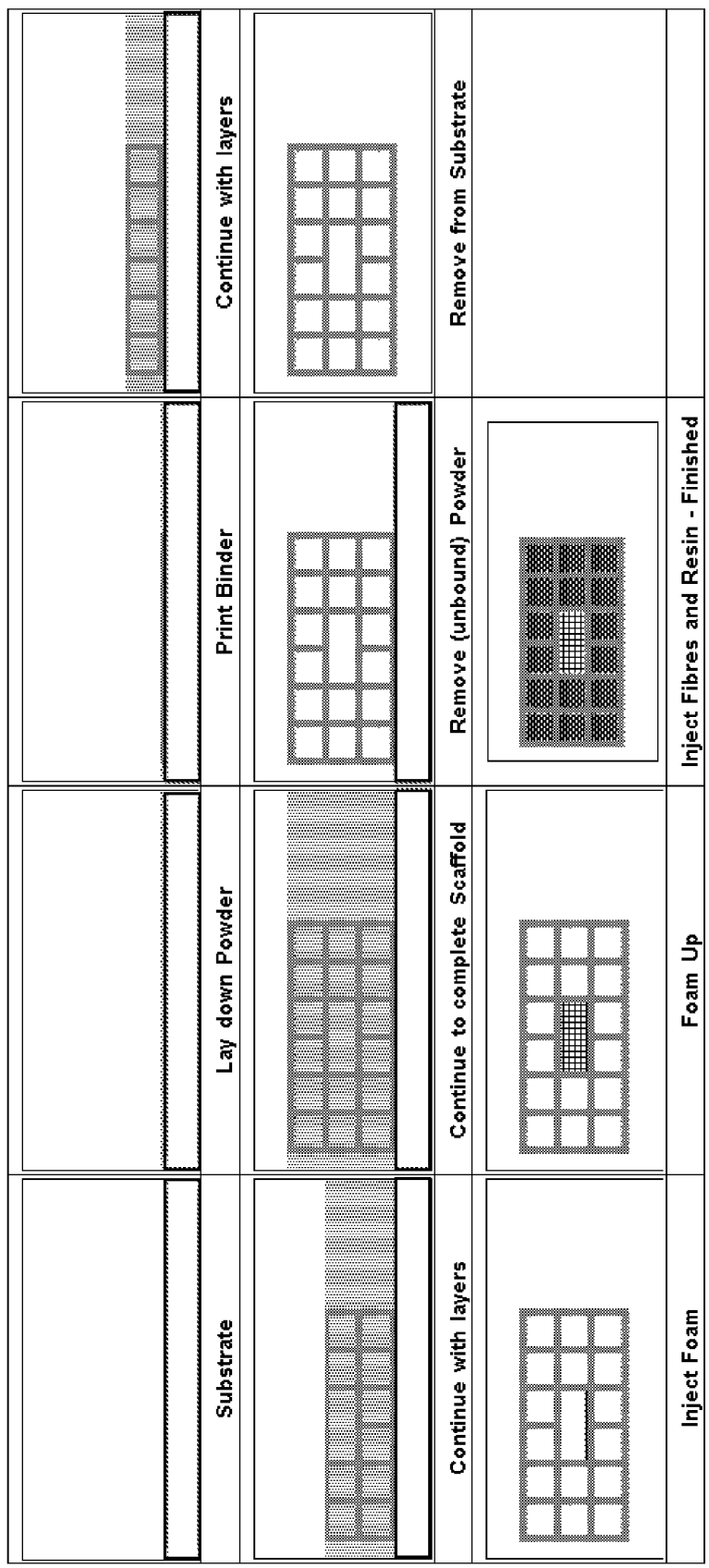
FIG. 5 is a diagram illustrating steps in a first example of a method of making a composite product.

Referring to FIG. 5, a series of stages of manufacture of the scaffold is shown, based upon the 3D printing technique which uses layers of powder to form the structure. A suitable substrate is provided and a layer of powder is deposited on that substrate. A binder is printed in the relevant pattern to solidify the powder and start forming the structure of the scaffold in layers. The location of the binder in the figure is depicted by a darker tone. The laying down of powder and printing of binder is repeated until the entire scaffold structure has been created, including tubes shown here as square in cross section and a void shown as rectangular. The excess powder that has not been bound is then removed, as is the substrate. A foamable substance is then injected into the void and foamed so as to fill the void. This completes the scaffold manufacture and the scaffold/guide structure is now ready for filling. The tubes are then filled with fibre and impregnated with resin. The product is finished by removal of any external features left from the filling process and by appropriate surface treatment.

This process provides a simple and economic method of forming a fibre reinforced composite product, suitable for simpler products.

Variations on Process 1

The scaffold structure may be formed so as to be inherently self-supporting and capable of supporting the fibre investment processes described below, with, for example, compression resistant struts extending between tubes as appropriate. In one alternative, voids in the scaffold structure can be filled after the 3D printing process with other materials having the appropriate strength to provide stability both for the remaining processes and to the finished product.

The scaffold structure may include manifolds, usually outside the intended external surface of the finished product, which connect with the lumens of the various tubes and which assist with the process of filling the tubes with FRC. Some tubes may extend through the product from an (external) inlet manifold to an (external) outlet manifold. Sets of tubes may be interconnected. Some tubes may be porous to fluid, providing fluid communication with voids in the scaffold structure. Some tubes may be interconnected, within the form of the finished product, by capillaries or other secondary tubes to provide fluid interconnections between respective tube lumens. Again, various sets of tubes may have fluid interconnections. Some or all of the tubes may vary in the radial lumen dimension, along the length or along some of the length of the tube.

Limitations of Process 1

The scaffold structure as shown requires rather thick walls, both to be self-supporting and, more particularly, to withstand the pressures required to fill the tubes. Typical two-part resin materials are fairly viscous in themselves, and the viscosity is increased further if the density of fibres mixed with them increases beyond 10-20%. Thermoplastic resin/fibre mixes are even more viscous, and fibre fills are typically limited to no more than 30%. It is generally regarded as being preferable to lay down fibres in the dry state and to then inject the resin to wet the fibres and fill the spaces between them and to thereby exceed fill ratios of 30%. Again, the viscosity of the resins is such that long runs of fibre cannot be injected except by using high pressures—which the tube walls would have to support. The tube walls will not, in general, be capable of bearing high stresses and their presence in the final structure will reduce the overall strength to weight achievable.

Variations on Methods of Creating the Scaffold

In principle, any method may be used to form the scaffold structure. However, the requirement of providing a hollow scaffold structure of interleaving tubes means that conventional approaches to such fabrications are likely to impose limitations upon the geometry and topology which mitigate against the intention of the current invention. Therefore, it is most likely that the scaffold structure will be produced by some form of digital 3D printing.

3D Printing Machinery

Most methods of creating the scaffold involve "printing" successive sectional layers through the final shape. In each layer, part is composed of the finished material and part is either left void or filled with a sacrificial material that is subsequently removed.

The scaffold and manifold printing machine may comprise a bed which traverses back and forth in a first direction, the "X" direction, under multiple printing stations. In successive traverses, the printheads may be raised, or the bed may be lowered, in order to build up the layers and form the thickness of the final product. Each layer may form a section through the final object, together with a surrounding section through the manifolds. Particularly for low volume manufacture, the printheads may also scan back and forth in a second direction, the "Y" direction, with the bed advancing after each scan. This is often referred to as serial printing. Particularly for high volume manufacture, the printheads may form fixed arrays across the full width of the bed with continuous "X" direction movement of the bed.

There may be a need for more than one type of printhead to be used, depending on how many different materials are required and/or are being used. For example, the manifolds may be formed from a different material from the scaffold and/or the internal tubes may need to be coated with a certain material. Alternative forms of delivery devices may need to be supplied; for example, an extrusion nozzle is used in some types of machine to form filaments of plastic from which the sections are built up, or an optical head may be used for curing selected parts of a liquid layer.

In 3D printing systems generally, multiple printheads may be used in parallel. Thus, in the current context, secondary heads may provide specialised compounds, chemicals or other promotion materials inside the tubes.

In one variation, the printing components are fixed and the platen on which the object is built rotates past each successive element of the printing process, and at the same time, screws downwards so that each turn corresponds to one layer. This reduces the time lost in a cycle and permits an array of different stations as required by the process.

A recent development to the powder method of 3D printing is a so-called continuous 3D printing method. The machine geometry is altered so that the build platen and printing assembly are tilted at an angle less than the angle of repose of the powder, which could be as great as 45°. The sections through the scaffold are taken at this angle and the embedded object is then withdrawn from the working area horizontally, or the whole printing system might track away from the stationary object. This approach may be used to enable the printing of larger objects and an increased production rate.

Printheads are now becoming available which are able to achieve the sorts of throughput required as well as the reliability for mass production of relatively large scaffold structures. In the printing industry, printhead assemblies up to 1 m wide are used to print webs continuously at up to 1 m/s. Such systems would be capable of printing 1 million cubic metres per year—corresponding to tens of wind turbine blades from a single system.

3D printing techniques use a digital file to define the successive layers. The digital file may be produced by slicing a virtual model, generally by using a modelling program or by scanning an existing object. Each layer represents a section through the object, and the successive layers are independent of each other. Consequently, interleaved surfaces and spaces can be formed, not necessarily communicating with each other, thereby generating complete objects in which parts are inaccessible from the outside. Hence, the general technique or 3D printing is singularly well suited to the function required by the current invention.

There are different methods for building up the layers, many of which are associated with particular materials. Any of the known methods are capable of producing scaffolds as described and are described briefly below. The choice of a particular method will depend in part on the suitability of the scaffold building material for incorporation into the final product, which in turn depends upon the compatibility of the scaffold material with the matrix material of the FRC.

Powder System Variations

The powder technique described for Process 1 is one of the most widely used methods and has numerous variations, particularly in respect to the materials that can be used. The simplest combination of materials in widespread use is Plaster of Paris as the powder and water as the binder. This produces a material that is quite stiff and which can provide limited stress bearing capability within the finished composite—its stiffness being reasonably well matched to the FRC material and therefore capable of load sharing. Furthermore, alternative binder materials may be used such as Acrylates either cured anaerobically or by application of UV light. Such materials are highly compatible with the typical resins used for FRC. They can also be dissolved in appropriate solvents—allowing for the removal of part or all of the original scaffold (see below). When more than one binder is used, it is possible to use solvents to remove only selected parts of the scaffold (for example, temporary supports). In many cases, multi-coloured binders are used to provide built-in colouration. Special binders (including coloured ones) may be used to define the external surfaces of the product.

One variation on the powder method uses a sintering agent as the binder which causes the powder to sinter on the application of heat. This method has been used for the printing of thermoplastics, metals and ceramics, and enables the process to produce functional materials in their own right. This method has a further alternative in that the printed agent can be used to prevent sintering rather than to cause it—in this case the printed part of each layer is the unwanted material.

In one aspect of sintering techniques, alumina may be made into 3D objects using the powder method and a sintering promoter. The promoter may be in the form of an Aluminium metallo-organic compound. When this is printed into the powder and the resultant object sintered, the metallo-organic forms Alumina and causes the powder to sinter at relatively low temperatures (approximately 300° C. compared to approximately 1200° C. as is required normally). After using this process to make the scaffold, short staple Carbon fibres may be invested into the tubes together with further metallo-organic compounds. Further sintering may then be used to incorporate the Carbon fibre into the Alumina matrix. This may enhance the properties of the material when compared with unreinforced Alumina, which is brittle and subject to crack propagation. The Carbon fibres may bear tension to overcome any areas of low tensile strength due to cracks and/or similar defects. The resultant product may have the required structural properties, at least in the directions of the principle stresses, and a net shape ceramic may be formed without the requirement of a mould and at much lower temperatures than is conventionally possible. Given the low sintering temperature, glass fibre reinforcement may also be possible using this method, and there are even some thermoplastic materials, such as PEEK whose melting point is above the required sintering temperature. Such structures may have much higher "toughness" than solid ceramics, and the use of the 3D printing method would offer great flexibility in the form and structural properties of the finished product.

Whilst this invention proposes in certain aspects a novel application for 3D printing, it will not be necessary here to describe 3D printing processes in great detail. The skilled reader will be able to turn to the art for detailed instruction on the selection of appropriate techniques and process parameters for the examples mentioned in this specification. The other 3D printing techniques are summarised below.

Stereolithography (SLA)

SLA is another method that may be used to create a scaffold. It uses a monomer material, often a liquid, and selectively polymerises it using light. Typically, the monomer is placed in a tray with a transparent base and the monomer exposed to the light source through the base. The liquid is added in layers and the light source is a laser, scanned and modulated over the surface of the liquid. In a faster system, the light may be projected from below using an LCD to modulate it. In some systems, the object may be withdrawn continuously. Alternatively, the exposure can be carried out from above, with the tray withdrawn downwards, and the exposure source may be a light beam (such as a laser) which traverses above the tray, selectively exposing the part to be retained.

This method may be beneficial for creating the scaffold where internal surfaces or walls are to be etched away, since the photopolymers are usually soluble in appropriate chemicals.

A material that solidifies with minimal shrinkage is preferred. The scaffold may comprise acrylate and/or any acrylics curable by UV. Any other UV curable, epoxy and/or polyurethane may be used and/or any other appropriate organic or inorganic material may be used.

Fused Deposition Modelling (FDM)

FDM describes another approach to 3D printing using plastic extrusion nozzles to lay down one or more materials serially—rather in the manner of a pen plotter.

In FDM there is no need to completely fill the unwanted parts, because the extruded filaments are capable of forming small bridge-like structures. Where long gaps are required, supports are built in at intervals. There are limitations on the form of the structure that can be produced, but such methods have been shown to be capable of producing substantial overhanging structures as long as they are supported at (relatively) infrequent intervals.

The extrusion heads can be attached to robots and thereby cover a large physical volume without requiring huge machines. This enables the production of large objects such as car bodies and buildings, for which latter purpose the thermoplastic is replaced by a suitably thixotropic cement or matrix mixture. The FDM process does not require the use of a filler material so that the resulting scaffold would be clean and ready to invest with fibre. Hollow regions could be filled with struts made directly from the thermoplastic material obviating the need for foam. It would also be simple to use two or more materials, with at least one of these providing an etchable wall material for the fibre filled tubes to enable selective etching, leaving no trace of the original scaffold. The supporting struts could be made of other, insoluble materials.

FDM is most efficient for sparse structures with a high proportion of void space.

3D Ink Jet Printing Systems

Whilst the powder system generally uses ink jet printheads, the term "3D Ink Jet Printing Systems" usually describes a method using two or more Inkjet printheads to print simultaneously a structure and a support material, without requiring the powder bed. Typically, both materials are liquids which solidify on deposition. These can include hot melts and photopolymers, in each case there being two types, one of which, the support, can be removed by low heat and/or solvents without affecting the structural material. Every layer is broadly planar, being either comprised of the structural material or the support. However, surface tension effects tend to cause the surface of each layer to be corrugated, and it is therefore common to have a planarising step, by means of a milling process or otherwise, between each deposition step. The range of materials that can be used is smaller than for the other systems described above, but this method generally has the highest resolution and is therefore particularly suited to the manufacture of very fine structures.

Investment with Preformed Fibres and/or Fibre Monomers and/or Resin Investment

Once the scaffold and manifold system is complete, the printing machine may be vacated allowing for another scaffold structure to be formed. The tubes may then be filled with a structural fibre by pumping appropriate materials into the tubes—referred to as "investing" the tubes.

Any fibre may be employed within the system, depending on the system and product requirements. Organic and/or inorganic; natural or synthetic; short staple and/or long fibres may be used. Carbon fibre and glass fibre may commonly be used with range of tube matrix materials to suit the application, including resin base materials and ceramics. In one common example, the fibres are inorganic, short staple and the tube matrix material is strong in compression. The fibres may be formed of an organic material, including both synthetic and natural materials. The use of bamboo as a source of fibre for FRCs has already been mentioned. Processes also exist for extracting wood fibres from a number of wood materials. Those wood fibres can then be invested using water or other compatible carrier fluid. An organically compatible matrix material will be chosen; for example, when wood fibres are used, lignin may be employed as the matrix material.

The machinery for investment may consist of a robotically positioned supply nozzle that can be pressed against the open ends of the tubes in the scaffold where they emerge at the surface—see FIG. 4, for example. Multiple such delivery systems may be used to speed up the process.

Alternatively, a manifold structure may be used to connect a small number of supply points to groups of scaffold tubes and/or the voids in the structure, allowing the filling of such groups to proceed in parallel. The external connections to the manifolds may be ports, which may be connected to a series of delivery machines via tubes. These machines may supply the scaffold and/or tubes with all of the fibres and/or resins and/or any other materials they may require for the complete investment process. There may be flushing ports on one or more manifolds to allow the apparatus to be cleaned between steps or products.

The manifolds may be separate devices used to invest multiple copies of a single product, or they may be printed during the building of the scaffold and used only once for investment before being removed in the finishing step.

The central machine for carrying out each stage of investment may need to be connected to multiple products throughout, and/or at different stages in, the process. Each machine may need to be supplied with the appropriate material and may contain pumps and/or valves and/or similar, which can be controlled to carry out the designated sequence of operations.

Investment Processes

The investment process may consist of pumping a liquid matrix material loaded with fibres as described in Process 1, followed by a curing step to solidify the matrix.

As stated above there are limitations to this approach, and there follows descriptions of alternative methods.

A (low viscosity) carrier fluid carrying the fibres can be flowed through the tube lumens, using the manifolds or other external connections, so as to deposit fibres within the tube lumens. A vacuum may be applied to far ends of the tubes, to a void communicating with porous regions of tubes, or to capillaries or other secondary tubes, so as to promote the inflow of carrier fluid bearing fibres and the outflow of carrier fluid once fibres have been deposited. The flow dynamics of this process should be arranged so as to promote the deposition of fibres aligned with the local axis of each tube. The details of the fluid dynamics may dictate the choice of the size of the tube lumens so as to maintain the alignment of the fibres within the tubes.

By using a carrier fluid (which flows out of the tube after depositing some or all of the fibre load) the fibre load can be progressively increased to a desired level which may be 20%; 30%; 40%; 50% or more. It will be understood that since the finished fibre loading is greater than—and can be very much greater than—the fibre loading of the carrier fluid, fibre loadings can be achieved that would be difficult, impossible (or practically impossible) if it was required to inject a fluid containing the finished fibre loading. The effective viscosity of a fluid, carrying reinforcing fibres at the finished fibre density may be 100 times or more greater than the viscosity of the unladen fluid. Also, a a carrier fluid can be chosen which has a significantly lower viscosity than the liquid precursor form of the resin material which will subsequently be injected.

Once the lumens have been filled to the greatest possible extent, the remaining carrier fluid is drawn off, and a drying agent passed through the tubes. The drying agent may be hot gas to promote evaporation or a highly volatile solvent that dissolves the carrier fluid and removes it by continued flushing, followed by evaporation of the remaining solvent. Such a solvent drying process may also be used as a means to coat the fibres and tube walls with adhesion promoting materials.

All remaining space between the fibres in a tube is then filled with an appropriate resin material of the type described above, the resin being flowed through the lumen in fluid form using a combination of pressure from the entry end and vacuum from the exit end. Such a tube matrix material should adhere to and interlock the fibres to form the composite structure. As is already known, injection of resin can be improved by adding a volatile solvent to the resin to reduce its viscosity, and then evaporating off the solvent. This can be done in multiple stages to improve the resin fill, and also assisted in the evaporation stage by use of vacuum to increase the rate of evaporation.

Depending upon the steps taken previously to stabilise the scaffold structure, any remaining voids may be filled and the exterior surface of the product finished as appropriate, including removal of the external manifolds.

Use of Capillaries to Assist Investment

Figure 6:
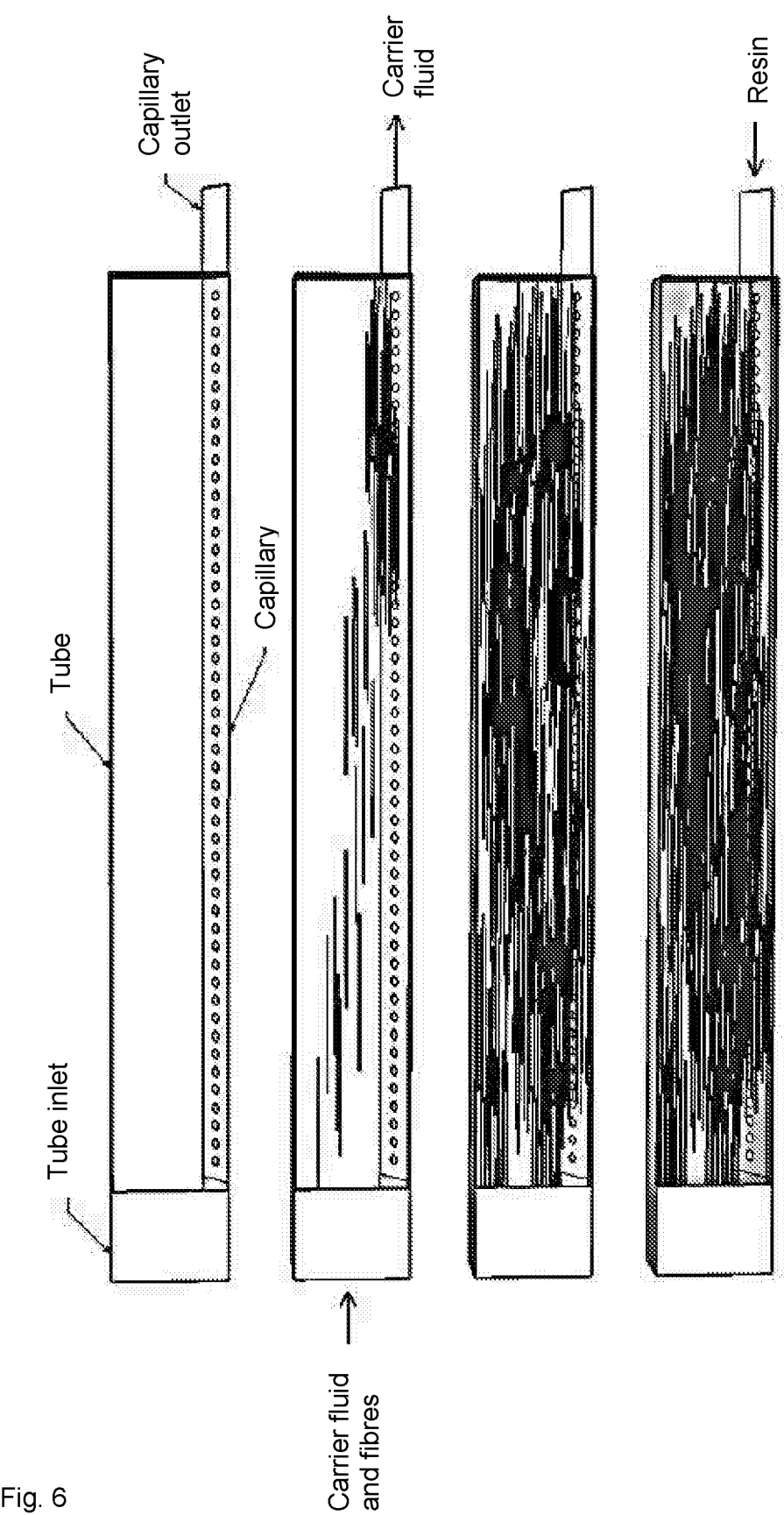
FIG. 6 is a longitudinal section through a guide tube that also incorporates a capillary tube, with 3 further views showing stages in investing the tube.

FIG. 6a shows how capillary tubes can be used to assist with investment. It shows a section through part of the length of a tube lumen 602 which has been subdivided by a wall or walls 604 to provide a separate, generally much smaller, tube along the length of the lumen. The dividing walls are "porous"—either by being made of a porous material, for example by using an open network of printed dots in the powder process, or by providing specific apertures within the dividing walls and communicating between the tube and the capillary.

The tube lumen is open at one end to be the entry port (possibly connecting to other tube lumens via a manifold 606) and the capillary is open at the other end at a capillary outlet. In investing the fibres, the carrier liquid, containing a relatively low percentage of fibres, is pumped in through the tube lumen under pressure as shown in FIG. 6b, and the carrier liquid is drawn out under vacuum at the other end through the capillary. The dynamic fluid pressure in this arrangement is such that the greatest pressure differential across the dividing wall occurs at the closed end of the lumen, and therefore the first fibres to arrive will get sucked against the dividing wall at the closed end. As more fibres arrive, this pressure differential will reduce (as the fibres block the porous wall) and deposition will proceed backwards along the tube. This is illustrated in FIG. 6c. The final fill proportion that can be achieved by this method is likely to be far higher than that which could be achieved by the simple method described in Process 1.

The carrier liquid is then evaporated off, and the capillary can then be used to inject the matrix forming resin from the far end, as depicted in FIG. 6d, with the capillary effectively becoming a feed tube such as those used in injection moulding to distribute the liquid material. It is known that such feed tubes greatly assist and speed up the resin injection process in conventional composite manufacturing.

The capillary may form part of the main tube lumen as shown here, or may be a part of the void structure of the scaffold. Ports (or porosity) in a shared wall between a capillary and the associated tube are of course only one way of providing for flow of carrier fluids out of the tube lumens.

Investment by this means is shown in Process 2 below.

EXAMPLE PROCESS 2

Figure 7:
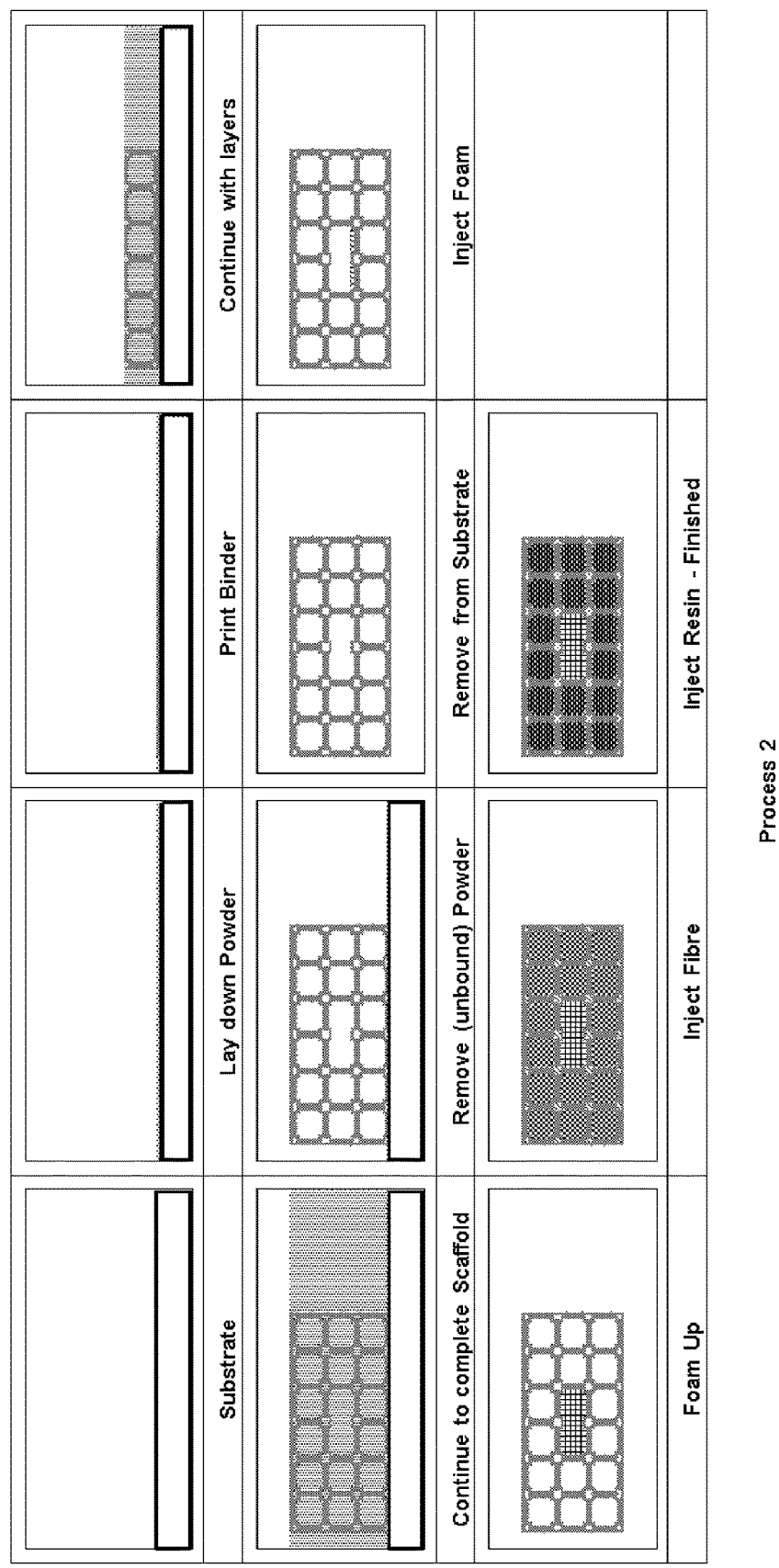
FIG. 7 is a diagram illustrating steps in a second example of a method of making a composite product.

This method of investment is illustrated as a process in FIG. 7, This starts as Process 1 but builds a scaffold structure having not only the tubes and appropriate voids, but also capillaries, which communicate with the tube lumens to enable excess carrier fluid to be removed under vacuum.

The diagram shows the investing of fibres into the tube lumens and, once the desired fibre density has been achieved, the injection of resin. Resin may be injected from the end of a tube but preferably through the capillaries.

Investment with Fibres

The processes described above are likely to work best when the fibres are in the form of short staples. In current composite manufacturing, this term generally applies to fibres that have been cut into 1-5 mm lengths, and these are generally used in conjunction with thermoplastic matrices in injection moulding processes. The resultant fibre orientation is partly random and partly aligned to the flow of the matrix during moulding. Most high performance composites hitherto use continuous fibres, "tows", to form the reinforcement. In the process described above, much longer staples, 6 mm and above and preferably much greater than the cross-sectional dimension of the tubes, may be used. In this case, the final strength of the fibre bundle within the tube is likely to be comparable to that of continuous tows.

Moreover, the use of staple fibres is compatible with varying cross section along the length of the tubes, and therefore lends itself to building of complex shapes with appropriately chosen fibre quantities at all points within the structure.

Removal of Scaffold Walls

The processes defined so far all result in the original scaffold material being incorporated into the final product. This requires that this material be compatible with the resin and for its structural properties not to compromise the final performance.

A further extension of these processes would enable the removal of much or all of the original scaffold tube walls so as to achieve an overall higher fill of load bearing fibre material. To this end, the tubes are designated in two or more subsets for each of the crossing directions within the structure. The sets are such that no tube within the set shares a common wall with any other member of the same set, although they may join at edges, possible via a capillary tube. The filling sequence then proceeds:
 a) Fill voids with foam (which must resist the etchant used below);
 b) For a first subset of tubes, pass an etchant through the set so as to partially or completely remove the scaffold walls;
 c) Fill the tubes in the set with fibre and matrix material;
 d) Cure the matrix material;
 e) Repeat steps b) and c) for the second, and other, subsets; and
 f) Repeat steps b) to e) for all the remaining crossing directions.

The final result of these processes is to fill all the tubes with fibre-matrix, but the original scaffold walls will have been etched away during the process. The only remaining scaffold structure will be the original capillary tubes.

EXAMPLE PROCESS 3

Figure 8:
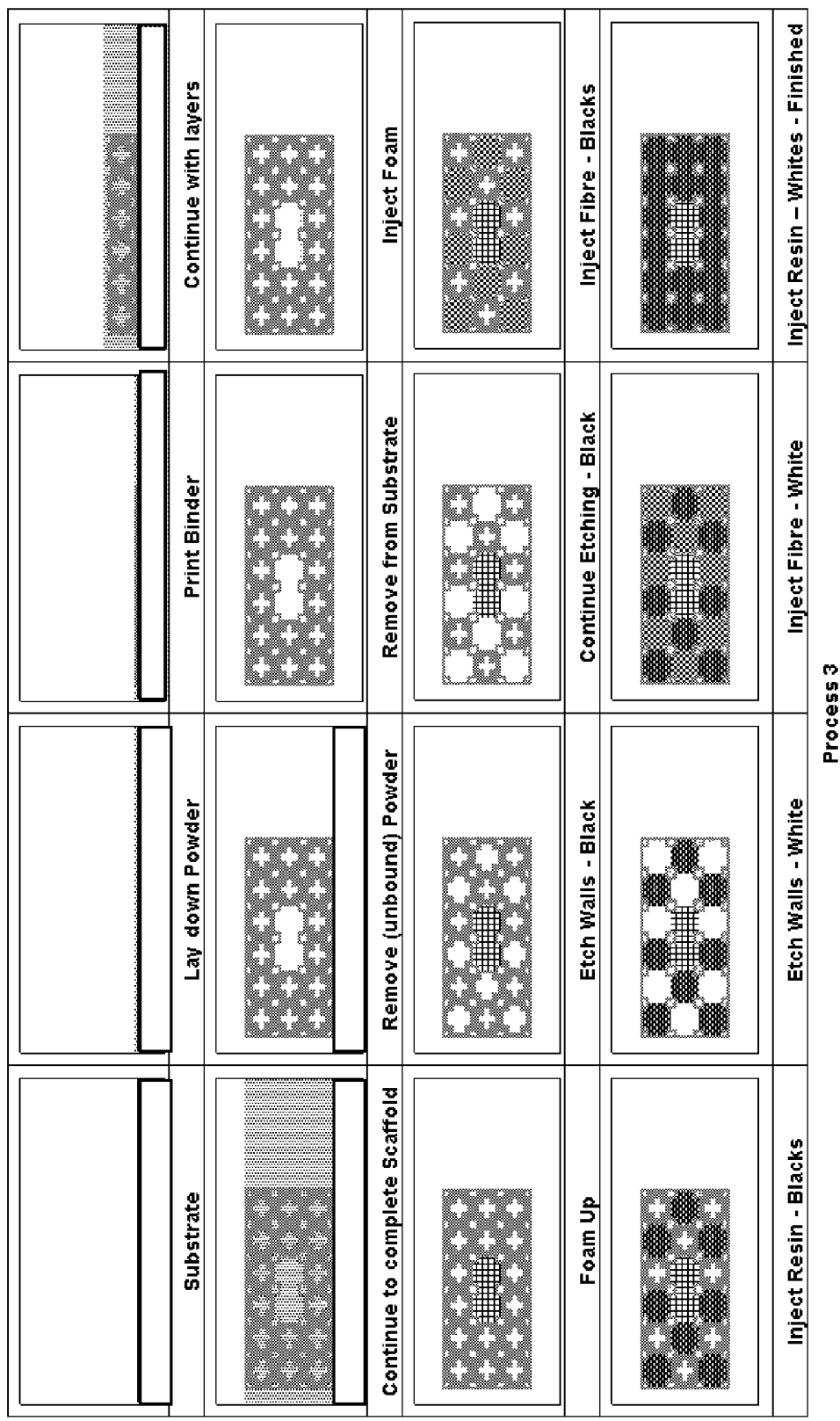
FIG. 8 is a diagram illustrating steps in a third example of a method of making a composite product.

FIG. 8 shows the process steps to implement the etching sequence.

The steps of repeatedly laying down powder and printing binder to form a structure having tubes and capillaries; removing excess powder and filling a void with foam, are broadly as described above. In this figure, the tubes are shown to have a cruciform cross-section; which arises from the presence of the capillary tubes, which must not be fully etched away. It also shows more clearly the increased wall thickness in the scaffold that can be used in this process. This leads to greater stability of the unfilled scaffold structure and allows higher filling pressures than for either of the preceding processes. Essentially, the tube wall thickness is reduced by etching away tube material before the investment step. Structural integrity is maintained in this process by first etching only those tubes that are supported or bounded by neighbouring tubes or filled voids. Those etched tube lumens are then filled with fibre and resin. In a second step, remaining tubes can be etched, with the tube walls supported (or the tube lumen bounded) by the resin impregnated fibre in the neighbouring tube lumens.

The tubes and capillaries may for the purposes of illustration be divided into two sets as the "black" and "white" squares of a chess board. The "black" and "white" sets of tubes are then filled separately, etching their respective set of walls away first. Thus, at the walls of the black tubes are etched away and then injected with the fibre reinforced resin, the thicker walls of the white tubes providing stability. The walls of the white tubes are then etched away at and injected with the fibre reinforced resin at, the reinforced fibres of the black set providing stability to the white set. The final structure having been fully injected is then self-supportive. This process allows the tube walls to be removed completely so that only the walls of the capillaries remain of the original scaffold. This provides a resulting structure that is very structurally efficient, having the required fibres present for providing the necessary structural integrity, but a minimum of material not contributing to the structural integrity of the finished product.

As shown, selective etching of black and white tubes is achieved by appropriate control of the flow of etchant, for example by appropriate grouping of the capillaries. In appropriate cases, different parts of the structure may be formed from different materials allowing for selective etching of the relevant areas, without the need for controlling the etchant flow. For example, the two separate sets of tubes may be formed from different materials to each other and/or to their respective capillaries, or the tube walls may consist of a thin (permanent) membrane that cannot be etched, sandwiched by thicker supporting material that is etchable. In the case of the powder printing process, the thin membrane might be formed using water to solidify the Plaster of Paris, and the thickening layers by binding with soluble adhesive such as a UV curable acrylic.

Manifold Removal and Finishing

Once the tubes have been invested with fibres, the manifolds may be removed and the exposed surfaces may be finished.

This could be accomplished—for example—by a mechanical machining process, or by dissolving the manifold. The latter option would usually require that the resin from which the manifold is made be different from that of the scaffold structure and soluble in a solvent that does not attack the scaffold or fibre filling resin.

If machining were to be used to remove the manifolds, a polishing step could be used to expose the structure underlying the surface, also formed from the scaffold material. If a soluble material is used to produce the scaffold structure, this could also be used to form the outer skin of the scaffold structure and be removed together with the manifold.

If appropriate, the manifold structure can be removed intact, for re-use with a fresh and usually identical scaffold structure.

In an example in which the tubes are injected with a fluid consisting of a mixture of ceramic powder and fibres of a high melting point material in a carrier of metallo-organic material, manifolds may be removed in a graduated sintering process. For example, the product may be sintered in a series of increasingly high temperature stages which remove first the manifolds, then the binder material, then reduce the metallo-organic material, and then sinter the ceramic powder.

In any case, the surface may expose the entry points to the tubes. At these surfaces, decorative features may be produced to create the desired effect, to replicate the finish of a certain material for instance. This can be accomplished in the printing process by using decorative colours and patterns to simulate, for example, a wood grain. Conventional techniques may be applied to the surfaces to produce acceptable and/or more aesthetically pleasing finishes. To enhance the durability of the material, the surfaces may also be made resistant and/or impermeable by any suitable method.

Example Scaffold Structure

Reference is directed to FIG. 9 which illustrates a scaffold structure for the manufacture of the curved beam of FIG. 3 using Process 3 and shows details of parts of the tube/capillaries and a manifold for supplying the materials for investment.

In the manifold structure the groups referred to in Process 3 are joined so that the two sets in each of the three regions can be invested together from a single source. This is achieved in the flanges (where the tubes run from end to end of the beam) through the use of an appropriately fashioned manifold structure at each end of the beam. The tubes/capillaries in the web are aligned at ±45° so an additional feature is proposed of interconnecting (for example) all the "black" tubes, so as to provide a continuous "black" tube flow path extending from one end of the beam to the other. Similarly, interconnections are made so as to provide respective end-to-end flow paths for:

"black" tubes
"black" capillaries
"white" tubes
"white" capillaries

It may be convenient to provide a manifold at one end of the beam with a "black" tube port and a "white" tube port with the manifold at the other end of the beam providing "black" and "white" capillary ports.

Figure 9A:
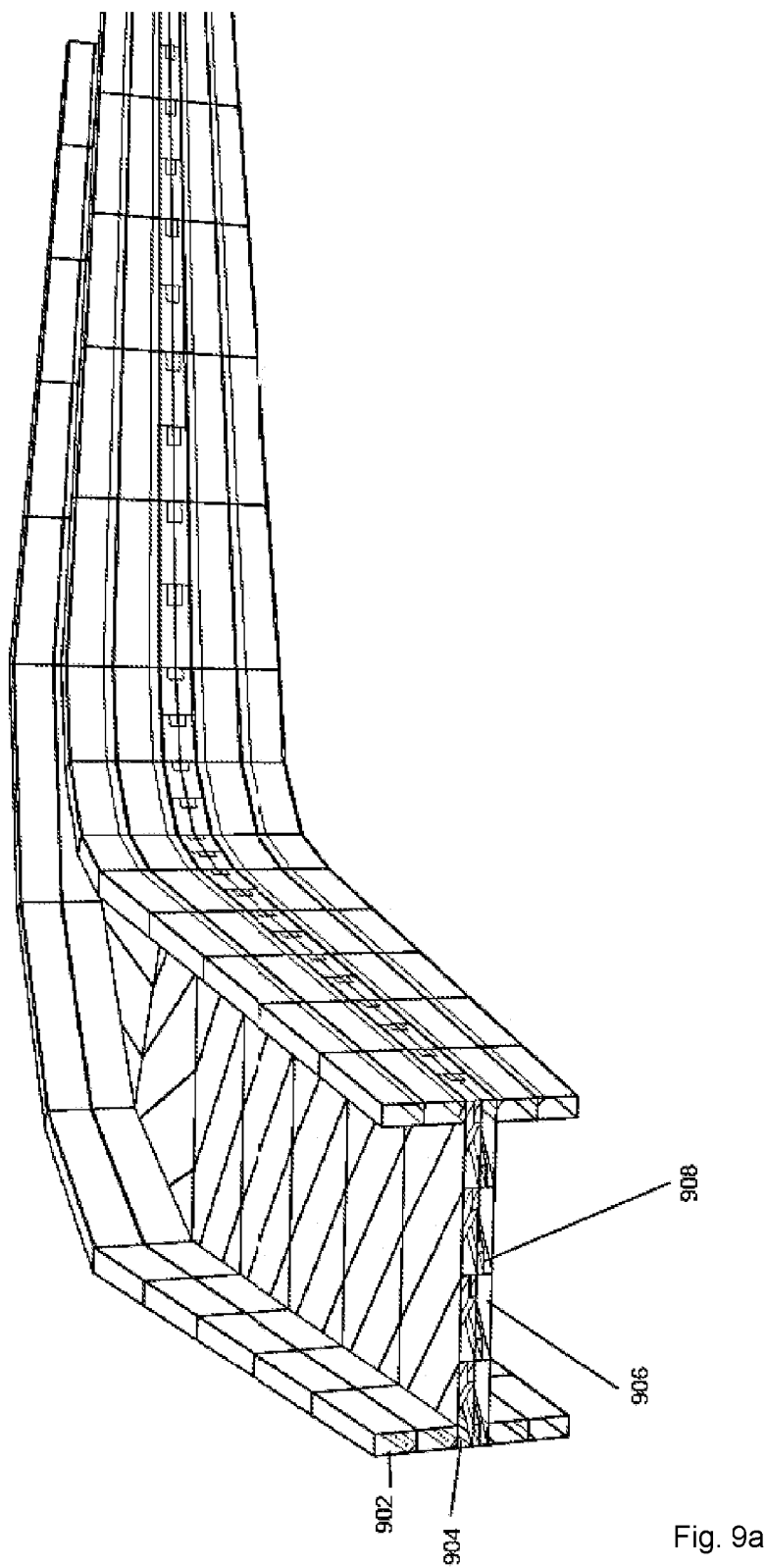
FIG. 9a is a perspective view of a scaffold structure for manufacturing the composite of FIG. 3.

Reference is directed to FIG. 9A which is a perspective view from one end of the scaffold structure, with the manifold removed to expose the open end of the tubes and capillaries.

It will be seen that in the scaffold, each flange is formed from four tubes 902, each having a capillary 904 formed by an inclined wall at one corner of the rectangular tube lumen cross-section. Each ±45° tube 906 in the web has an internal capillary 908 with—in this case—both the tube and the capillary having rectangular cross-sections.

Figure 9B:
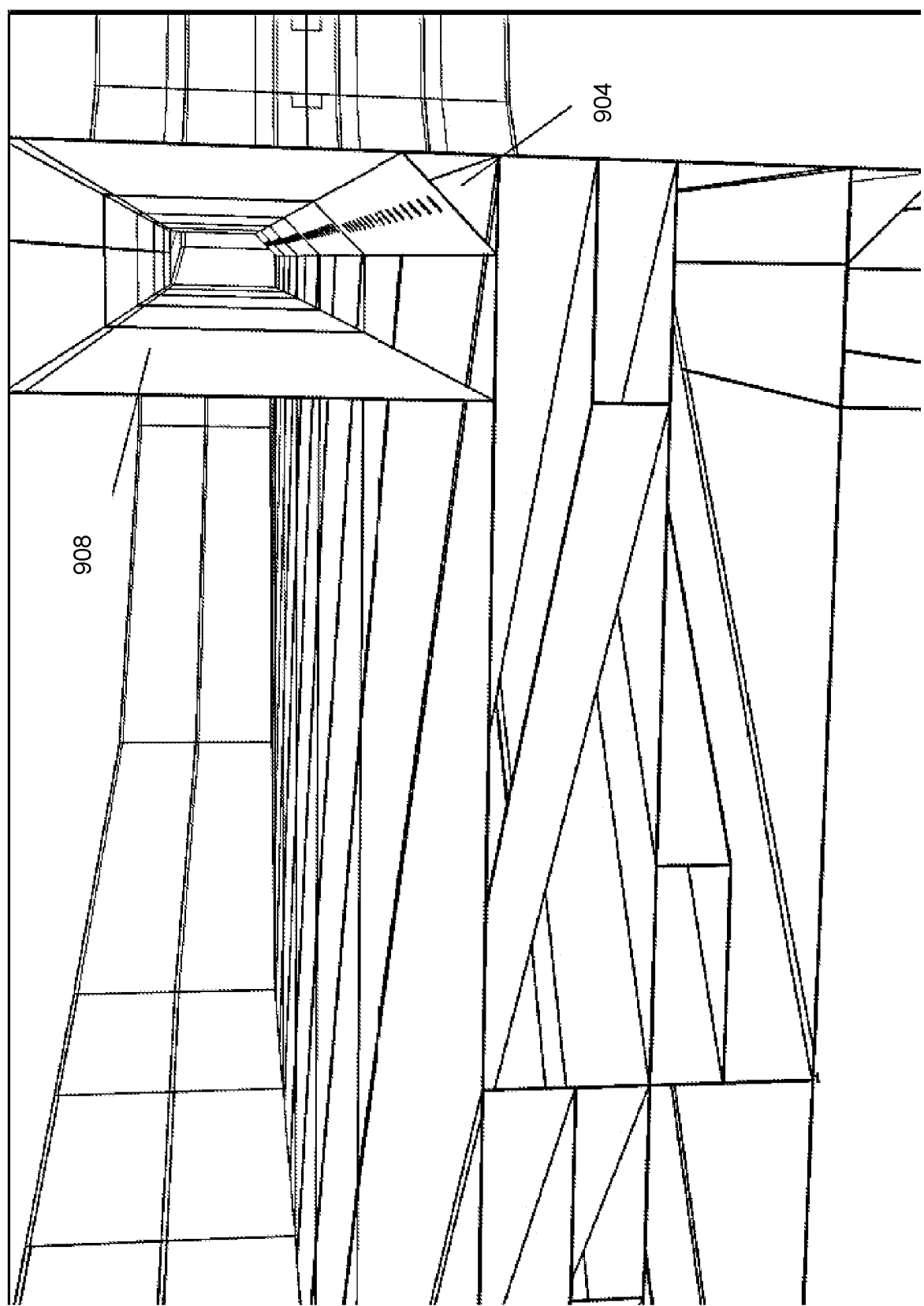
FIG. 9b shows the internal detail showing the tube lumens and capillary feed tubes ready for filling with fibres and matrix.

FIG. 9B shows to a larger scale the rectangular cross-section capillary 908 in each web tube 906 and the triangular cross-section capillary 904 in each flange tube 902.

Figure 9C:
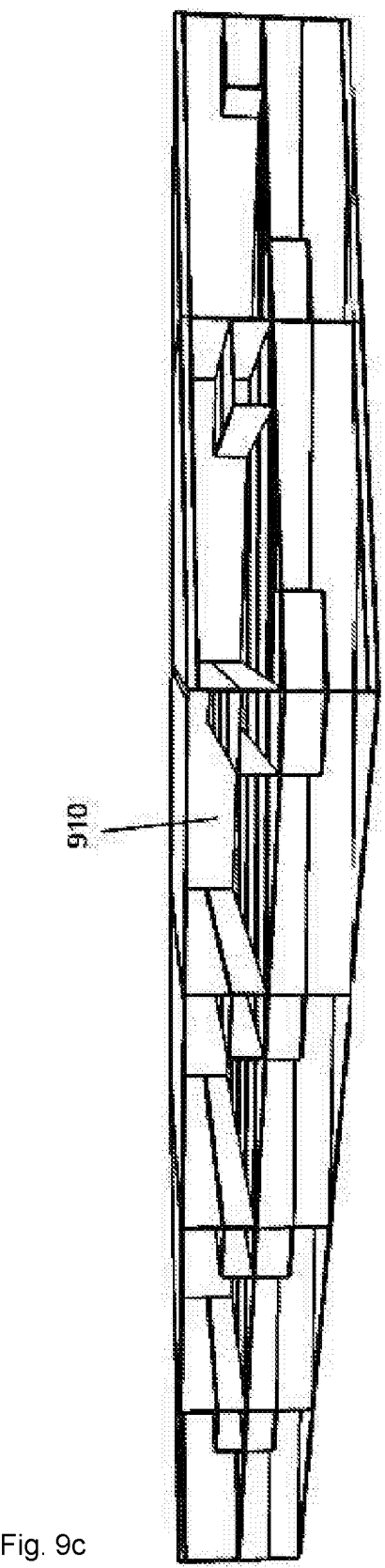
FIG. 9c shows further details of tubes in the web part.

FIG. 9C is a view of the web, with the flanges removed. Interconnections 910 are shown which join one end of a +45° tube with the overlying end of a −45° tube, to create a zig-zag flow path running from one end of the beam to the other. Similar interconnections are made to create an associated zig-zag flow path through the capillaries.

Figure 9D:
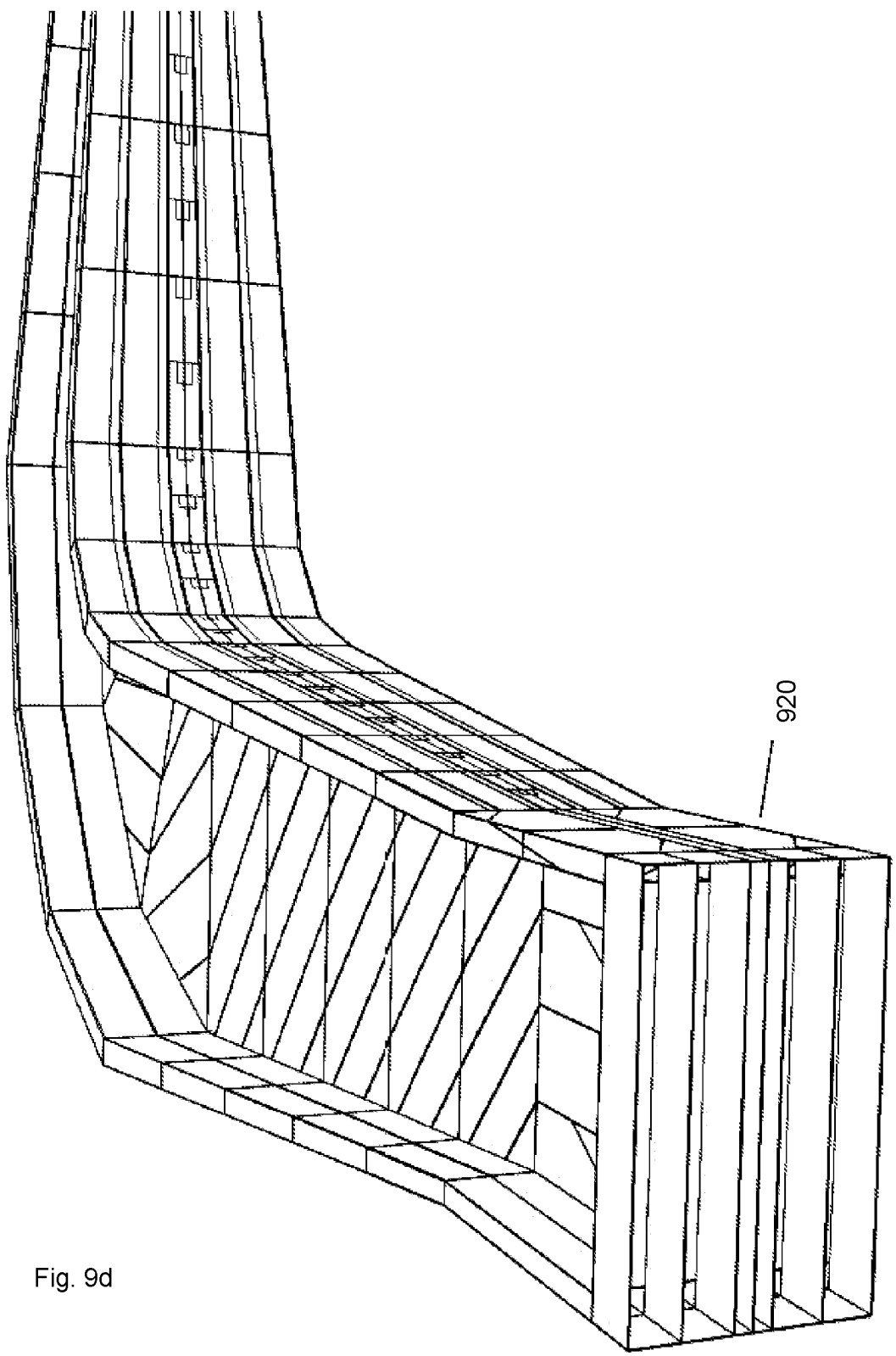
FIG. 9d shows a manifold component attached to the end of the scaffold of FIG. 9 for filling the structure.
Figure 9E:
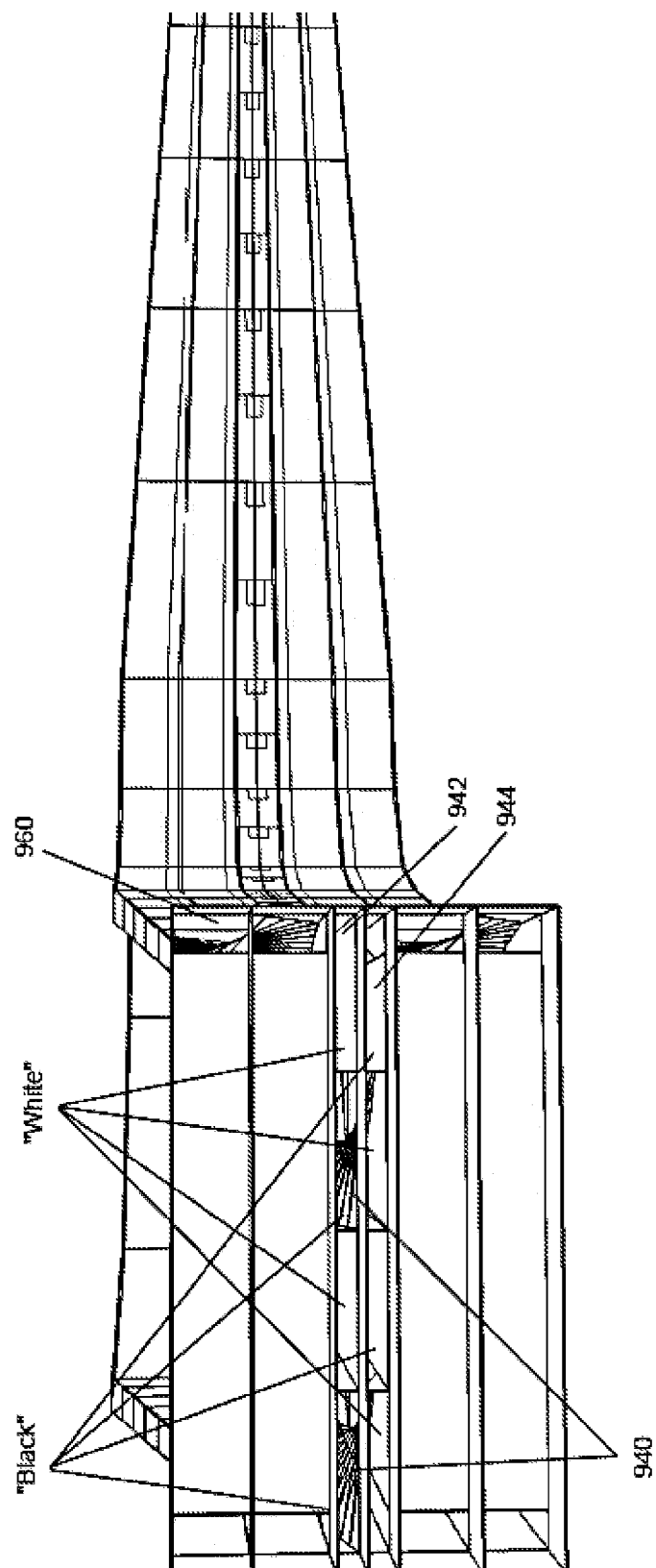
FIG. 9e shows more detail of the manifold structure.

FIG. 9D shows a manifold structure 920 at one end of the beam. There is a similar manifold structure at the other end of the beam, with—as mentioned—above—one manifold connecting with tubes and the other manifold connecting with capillaries. The design of the manifold is seen more clearly from FIG. 9E.

It will be seen that the eight tubes that open to the end of the web are divided as to four "black" and "four "white". Two twist sections 940 are provided at the "scaffold" side of the manifold which effectively take pairs of the tubes to be invested serially, and twist the internal dividing surface through 180° so as to exchange the positions of the tubes at the surface. At this point, all the "black" square feed tubes of the web can be joined to one port 942 and all the "White" square tubes to another port 944 without having to make complex crossings.

A similar step may be taken with the flanges, with twist sections 960 in one flange twisting the "black" and "white" tubes so that a single port can feed the two upper "black" flange tubes and a single port can feed the two upper "white" flange tubes (and similarly with the lower flange tubes).

Figure 9F:
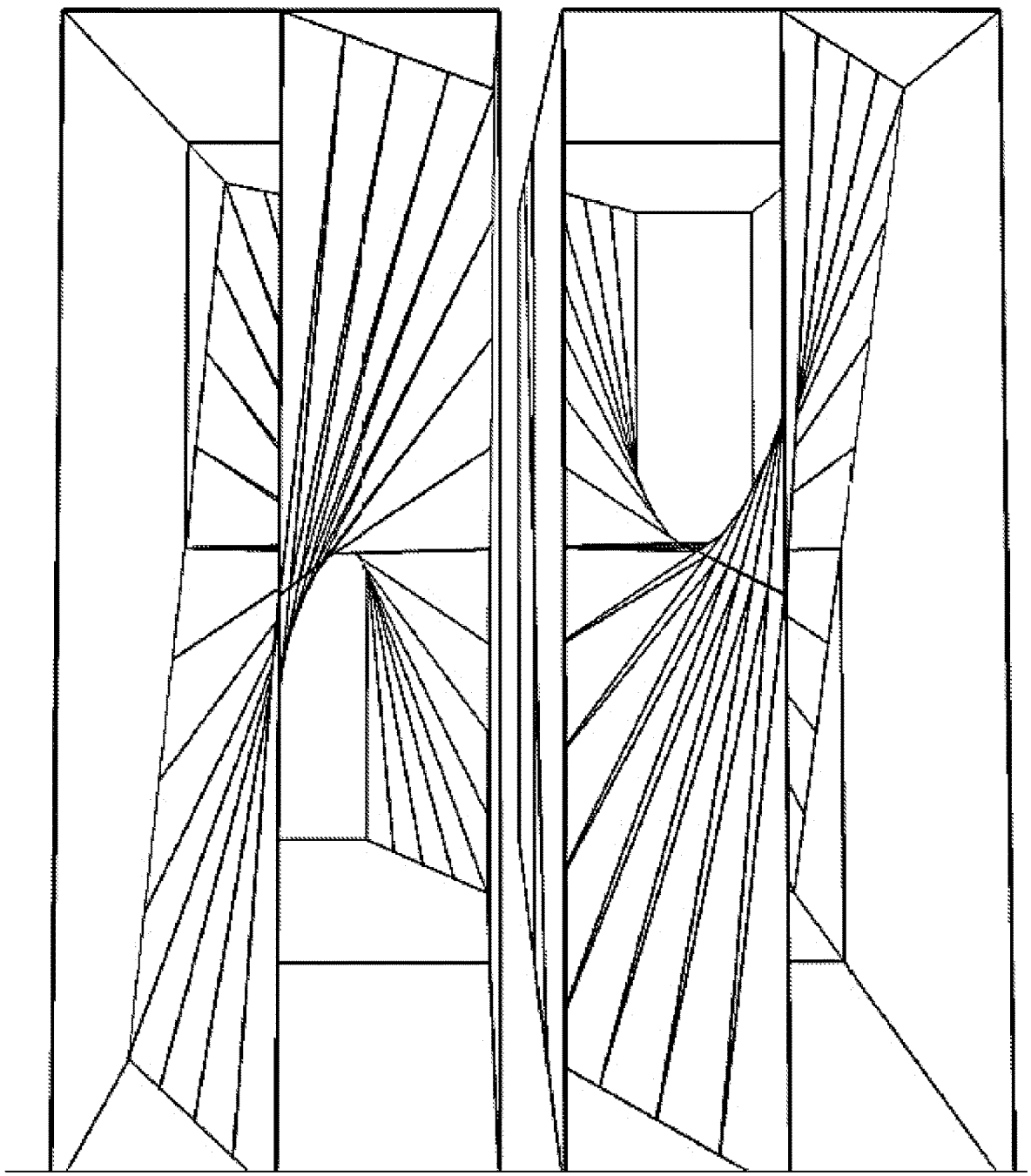
FIG. 9f shows a twisted manifold tube.
Figure 9G:
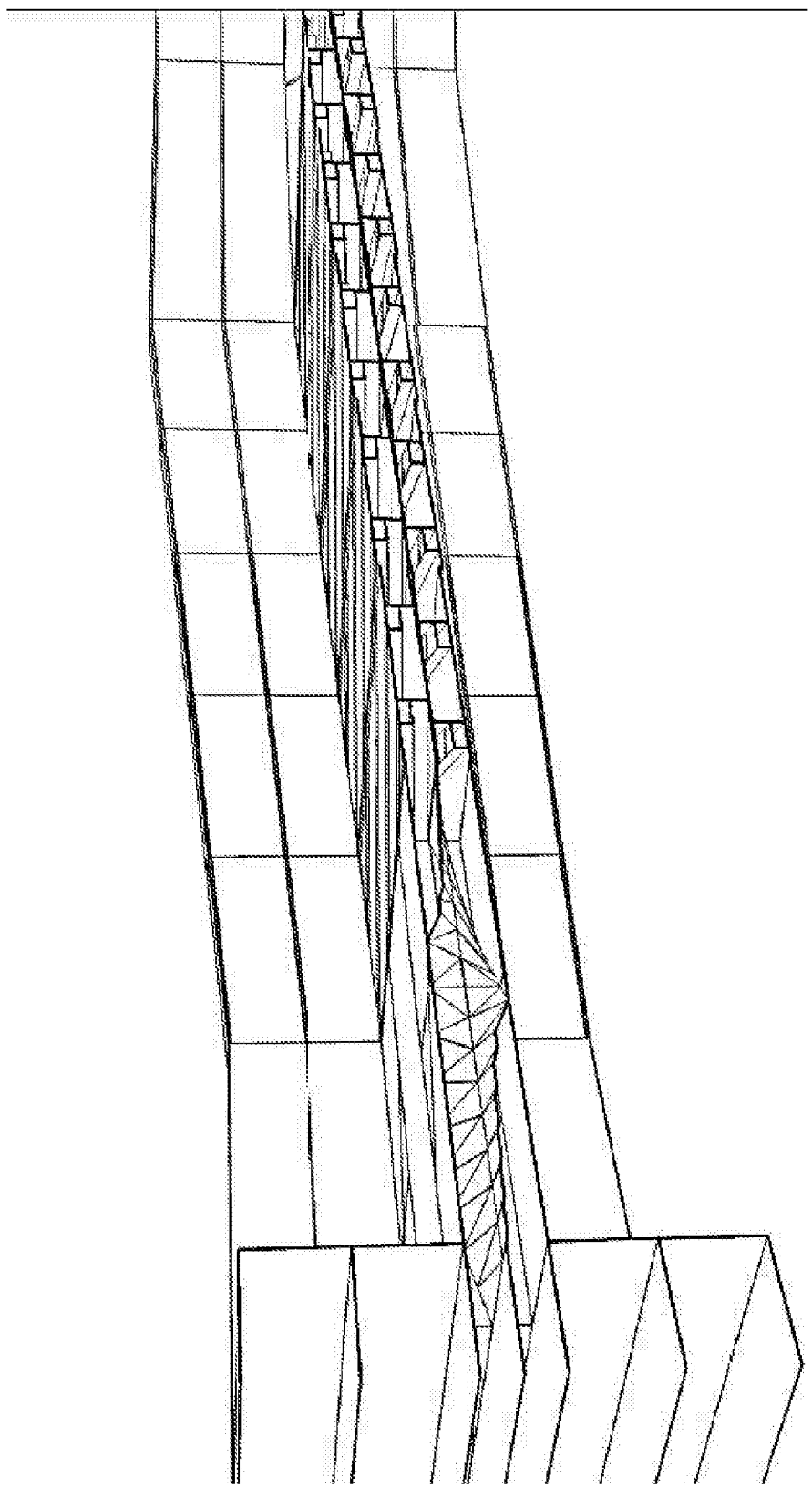
FIG. 9g shows in section the manifold structure and part of the scaffold structure.

An enlarged view of each end of a twist section is provided in FIG. 9F to show more clearly how the internal dividing surface serves to interchange the (in this case) vertical positions of the "black" and "white" tubes.

FIG. 9G shows again how each twist section interchanges the vertical positions of appropriate tubes to simplify the manifold structure.

It will be understood that a further twist section can be inserted if appropriate to reduce further the number of manifold ports required.

At the entry end of the structure, the capillary tubes are blocked off by a closing wall in the scaffold. At the far (exit) end, all the main tube lumens are likewise blocked off, but the capillary tubes are left open. An identical manifold unit placed at the exit end can now service the fluid flows in the capillaries.

In this manner, all of the investment processes can be carried out by access only to the end sections of the structure. This will be a considerable advantage for many products, particularly those of an elongated shape. In other products, different manifold structures—with or without twisted sections—may be more appropriate.

It will be understood that with the versatility of the processes that have been described, a large variety of products can be manufactured using scaffold structures having a wide variety of forms. The various techniques for I beams that have been exemplified here can be used with modifications that will appear to the skilled man. Other products may be formed without reliance on I beam structures, with the techniques disclosed here for the creation and fibre loading of tube lumens being applicable to tubes of many other geometries.

The above embodiments are described by way of example only. Many variations are possible without departing from the scope of the invention as defined in the appended claims.

The invention claimed is:

1. A method of making a composite product having an external surface defining a product interior, the method comprising the steps of:
    forming a scaffold structure comprising a set of tubes defining respective tube lumens running within the product interior;
    investing the tube lumens with fibres and optional matrix material, wherein the step of investing the tube lumens with fibres comprises flowing a carrier fluid through and out of the tube lumens, the carrier fluid carrying said fibres; and
    hardening any matrix material;
    the scaffold structure further comprising a respective capillary running essentially parallel to each tube lumen, carrier fluid flowing radially out of the tube lumen and into the associated capillary in which each capillary is of smaller cross section than the associated tube.

2. A method according to claim 1, in which carrier fluid flows radially out of the tube lumen and into the associated capillary via holes in or porosity of a shared wall.

3. A method according to claim 1, wherein at least a first end of a tube lumen extends to the external surface of the product and a carrier fluid carrying fibres enters the tube lumen axially at that first end.

4. A method according to claim 1, wherein carrier fluid leaves the tube lumen radially.

5. A method according to claim 1, wherein matrix material is introduced in fluid form into each tube lumen, after investing of the tube lumen with fibres, wherein matrix material enters the tube lumen radially.

6. A method according to claim 1, wherein one or more radial ports are provided in a tube, wherein at least one radial port of one tube in the set of tubes is interconnected with at least one radial port of another tube in the set of tubes.

7. A method according to claim 1, in which at least some of the tubes have porous walls enabling the passage of carrier fluid or matrix material but substantially preventing the passage of fibres.

8. A method according to claim 1, wherein the removal of carrier or other fluid from a tube lumen is promoted by the application of a vacuum.

9. A method according to claim 1, wherein the scaffold structure comprises at least one connection exterior to the product and communicating with at least some of the tube lumens; the method further comprising the step of removing the connection after the tube lumens have been invested with fibres and optional matrix material via the connection.

10. A method according to claim 1, wherein the scaffold structure comprises at least one connection exterior to the product and communicating with at least some of the tube lumens; the method further comprising the step of removing the connection after the tube lumens have been invested with fibres and optional matrix material via the connection said at least one connection comprising at least one fluid inlet manifold communicating with first ends of a set of tubes and at least one fluid outlet manifold.

11. A method according to claim 10, wherein the scaffold structure comprises a secondary fluid network serving to fluidly interconnect the respective tube lumens of a particular set, said network communicating with the fluid outlet manifold and/or a second fluid inlet manifold.

12. A method according to claim 10, in which voids defined within the product between tubes communicate with said fluid outlet manifold.

13. A method according to claim 1, in which the scaffold structure includes compression resistant struts in voids defined within the product between tubes, the struts serving to interconnect tubes.

14. A method according to claim 1, comprising the step of forming a foam in a void or voids between the set of tubes to support the tubes.

15. A method according to claim 1, further comprising the step, after formation of a set of tubes with tube walls formed of tube material and before investing the tube lumens with fibres, of reducing a tube wall thickness or removing a tube wall by removal of tube material.

16. A method according to claim 15, wherein tube material is removed by etching, wherein the tubes are divided into sets and differential etching of tube material is effected between respective sets.

* * * * *